United States Patent
Atallah et al.

(10) Patent No.: US 11,301,631 B1
(45) Date of Patent: Apr. 12, 2022

(54) VISUALLY CORRELATING INDIVIDUAL TERMS IN NATURAL LANGUAGE INPUT TO RESPECTIVE STRUCTURED PHRASES REPRESENTING THE NATURAL LANGUAGE INPUT

(71) Applicant: Tableau Software, LLC, Seattle, WA (US)

(72) Inventors: Ryan Andrew Atallah, Palo Alto, CA (US); Alex Djalali, Los Gatos, CA (US)

(73) Assignee: TABLEAU SOFTWARE, LLC, Seattle, WA (US)

( * ) Notice: Subject to any disclaimer, the term of this patent is extended or adjusted under 35 U.S.C. 154(b) by 0 days.

(21) Appl. No.: 17/063,663

(22) Filed: Oct. 5, 2020

(51) Int. Cl.
*G06F 17/00* (2019.01)
*G06F 40/284* (2020.01)
*G06F 40/274* (2020.01)
*G06F 40/247* (2020.01)

(52) U.S. Cl.
CPC .......... *G06F 40/284* (2020.01); *G06F 40/247* (2020.01); *G06F 40/274* (2020.01)

(58) Field of Classification Search
CPC ..... G06F 40/284; G06F 40/247; G06F 40/274
See application file for complete search history.

(56) References Cited

U.S. PATENT DOCUMENTS

| | | | |
|---|---|---|---|
| 7,019,749 B2 | 3/2006 | Guo et al. |
| 7,089,266 B2 | 8/2006 | Stolte et al. |
| 7,391,421 B2 | 6/2008 | Guo et al. |
| 7,606,714 B2 | 10/2009 | Williams et al. |
| 7,716,173 B2 | 5/2010 | Stolte et al. |
| 8,321,465 B2 | 11/2012 | Farber et al. |
| 8,489,641 B1 | 7/2013 | Seefeld et al. |
| 8,713,072 B2 | 4/2014 | Stolte et al. |
| 8,972,457 B2 | 3/2015 | Stolte et al. |
| 9,183,235 B2 | 11/2015 | Stolte et al. |
| 9,244,971 B1 | 1/2016 | Kalki |

(Continued)

FOREIGN PATENT DOCUMENTS

WO    WO2018/204696 A1    11/2018

OTHER PUBLICATIONS

Arnold et al., On Suggesting Phrases vs. Predicting Words for Mobile Text Composition, UIST, 2016, p. 603-608 (Year: 2016).*

(Continued)

*Primary Examiner* — Andrew T McIntosh
(74) *Attorney, Agent, or Firm* — Morgan, Lewis & Bockius LLP

(57) ABSTRACT

A computing device has a display, one or more processors, and memory. The memory stores one or more programs configured for execution by the one or more processors. The computing device receives from a user a partial natural language input related to a data source. The partial natural language input includes a most recently entered first term. In response to receiving the first term, the computing device generates a first token that includes the first term. The computing device maps the first token to one or more analytical concepts in a lexicon of the data source. The computing device determines a first interpretation corresponding to the first token. The computing device also displays a first phrase corresponding to the first interpretation. The first interpretation includes the first term.

17 Claims, 35 Drawing Sheets

Figure 4D Inset

(56) References Cited

U.S. PATENT DOCUMENTS

| | | | |
|---|---|---|---|
| 9,477,752 B1 | 10/2016 | Romano | |
| 9,501,585 B1 | 11/2016 | Gautam et al. | |
| 9,575,720 B2 | 2/2017 | Faaborg et al. | |
| 9,794,613 B2 | 10/2017 | Jang et al. | |
| 9,858,292 B1 | 1/2018 | Setlur et al. | |
| 9,953,645 B2 | 4/2018 | Bak et al. | |
| 2004/0030741 A1 | 2/2004 | Wolton et al. | |
| 2004/0039564 A1* | 2/2004 | Mueller | G06F 40/30 704/9 |
| 2004/0073565 A1 | 4/2004 | Kaufman et al. | |
| 2004/0114258 A1 | 6/2004 | Harris, III et al. | |
| 2005/0015364 A1 | 1/2005 | Payton et al. | |
| 2006/0021840 A1 | 2/2006 | Kimes et al. | |
| 2006/0218140 A1 | 9/2006 | Whitney et al. | |
| 2006/0259394 A1 | 11/2006 | Cushing et al. | |
| 2006/0259775 A2 | 11/2006 | Oliphant | |
| 2007/0174350 A1 | 7/2007 | Pell et al. | |
| 2007/0179939 A1 | 8/2007 | O'Neil et al. | |
| 2008/0046462 A1 | 2/2008 | Kaufman et al. | |
| 2009/0171924 A1 | 7/2009 | Nash et al. | |
| 2009/0299990 A1 | 12/2009 | Setlur et al. | |
| 2009/0313576 A1 | 12/2009 | Neumann et al. | |
| 2010/0030552 A1 | 2/2010 | Chen et al. | |
| 2010/0110076 A1 | 5/2010 | Hao et al. | |
| 2010/0313164 A1 | 12/2010 | Louch et al. | |
| 2011/0066972 A1 | 3/2011 | Sugiura | |
| 2011/0191303 A1 | 8/2011 | Kaufman et al. | |
| 2012/0047134 A1* | 2/2012 | Hansson | G06F 16/338 707/731 |
| 2012/0179713 A1 | 7/2012 | Stolte et al. | |
| 2013/0031126 A1 | 1/2013 | Setlur | |
| 2013/0055097 A1 | 2/2013 | Soroca et al. | |
| 2014/0189548 A1 | 7/2014 | Werner | |
| 2014/0192140 A1 | 7/2014 | Peevers et al. | |
| 2015/0019216 A1 | 1/2015 | Singh et al. | |
| 2015/0026153 A1 | 1/2015 | Gupta et al. | |
| 2015/0026609 A1 | 1/2015 | Kim | |
| 2015/0058318 A1 | 2/2015 | Blackwell et al. | |
| 2015/0095365 A1 | 4/2015 | Olenick et al. | |
| 2015/0123999 A1 | 5/2015 | Ofstad et al. | |
| 2015/0269175 A1* | 9/2015 | Espenshade | G06F 16/24522 706/47 |
| 2015/0310855 A1 | 10/2015 | Bak et al. | |
| 2015/0379989 A1 | 12/2015 | Balasubramanian et al. | |
| 2016/0103886 A1 | 4/2016 | Prophete et al. | |
| 2016/0188539 A1* | 6/2016 | Parker | G06F 3/0483 715/251 |
| 2016/0261675 A1 | 9/2016 | Block et al. | |
| 2016/0283588 A1 | 9/2016 | Katae | |
| 2016/0335180 A1 | 11/2016 | Teodorescu et al. | |
| 2016/0378725 A1 | 12/2016 | Marchsreiter | |
| 2017/0083615 A1 | 3/2017 | Boguraev et al. | |
| 2017/0285931 A1 | 10/2017 | Duhon et al. | |
| 2017/0357625 A1 | 12/2017 | Carpenter et al. | |
| 2018/0108359 A9 | 4/2018 | Gunn et al. | |
| 2018/0121618 A1 | 5/2018 | Smith et al. | |
| 2018/0181608 A1 | 6/2018 | Wu et al. | |
| 2019/0034429 A1 | 1/2019 | Das et al. | |
| 2019/0065456 A1 | 2/2019 | Platow | |
| 2019/0205442 A1 | 7/2019 | Vasudev et al. | |
| 2019/0362009 A1 | 11/2019 | Miseldine et al. | |
| 2020/0012638 A1 | 1/2020 | Lou et al. | |
| 2020/0065769 A1 | 2/2020 | Gupta et al. | |
| 2020/0089700 A1 | 3/2020 | Ericson et al. | |
| 2020/0089760 A1 | 3/2020 | Ericson et al. | |
| 2020/0274841 A1 | 8/2020 | Lee et al. | |
| 2020/0293167 A1 | 9/2020 | Blyumen | |
| 2021/0279805 A1 | 9/2021 | Elkan et al. | |

OTHER PUBLICATIONS

Allen, J. Recognizing Intentions from Natural Language Utterances. In Computational Models of Discourse, M. Brady, Ed. M.I.T. Press, Cambridge, Massachusetts, 1982, 12 pgs.

Androutsopoulos, I., Ritchie, G. D., and Thanisch, P. Natural language interfaces to databases—an introduction. Natural Language Engineering 1, Mar. 16, 1995, 50 pgs.

Aurisano, J., Kumar, A., Gonzales, A., Reda, K., Leigh, J., Di Eugenio, B., and Johnson, A. Show me data? observational study of a conversational interface in visual data exploration. In Poster at IEEE VIS 2015, IEEE (2015), 2 pgs.

Bostock, M., Ogievetsky, V., and Heer, J. D3: Data-driven documents. IEEE Transactions on Visualization & Computer Graphics (Proc. InfoVis), Oct. 23, 2011, 9 pgs.

Carbonell, J. G., Boggs, W. M., Mauldin, M. L., and Anick, P. G. The xcalibur project, a natural language interface to expert systems and data bases, 1985, 5 pgs.

Cover, T. M., and Thomas, J. A. Elements of Information Theory. Wiley-Interscience, New York, NY, USA, 1991, 36 pgs.

Cox, K., Grinter, R. E., Hibino, S. L., Jagadeesan, L. J., and Mantilla, D. A multi-modal natural language interface to an information visualization environment. International Journal of Speech Technology 4, 3 (2001), 18 pgs.

Ericson, Office Action, U.S. Appl. No. 16/680,431, dated Jan. 8, 2021, 18 pgs.

Ericson, Office Action, U.S. Appl. No. 16/134,907, dated May 13, 2020, 9 pgs.

Ericson, Office Action, U.S. Appl. No. 16/134,907, dated Nov. 12, 2020, 10 pgs.

Ericson, Office Action, U.S. Appl. No. 16/134,892, dated May 15, 2020, 10 pgs.

Ericson, Final Office Action, U.S. Appl. No. 16/134,892, dated Nov. 24, 2020, 11 pgs.

Egenhofer, M. Spatial sql: A query and presentation language. IEEE Transactions on Knowledge and Data Engineering 6, 1 (1994), 12 pgs.

Finin, T., Joshi, A. K., and Webber, B. Natural language interactions with artificial experts. Proceedings of the IEEE 74, 7 (Jun. 1986), 19 pgs.

Frank, A. U., and Mark, D. M. Language issues for Geographical information systems. In Geographical Information Systems: Principles and Applications, vol. 1, D. Maguire, M. Goodchild, and D. Rhind, Eds. Longman, London, 1991, 26 pgs.

Gao, T., Dontcheva, M., Adar, E., Liu, Z., and Karahalios, K. G. Datatone: Managing ambiguity in natural language interfaces for data visualization. In Proceedings of the 28th Annual ACM Symposium on User Interface Software Technology, UIST ' 15, ACM (New York, NY, USA, 2015), 12 pgs.

Grammel, L., Tory, M., and Storey, M. A. How information visualization novices construct visualizations. IEEE Transactions on Visualization and Computer Graphics 16, 6 (Nov. 2010), 10 pgs.

Hoque, Enamul et al., "Applying Pragmatics Principles for Interaction with Visual Analytics," IEEE Transaction of Visualization and Computer Graphics, IEEE Service Center, Los Alamitos, CA, vol. 24, No. 1, Jan. 1, 2018, 10 pgs.

IBM Watson Analytics, http://www.ibm.com/analytics/watson-analytics/, downloaded on May 9, 2017, 6 pgs.

Kumar et al., "Towards a Dialogue System that Supports Rich Visualizations of Data," Proceeding of the Sigdual 2016 Conference, LA, USA, ACL, Sep. 13, 2016, pp. 304-209, Xp055496498.

Lawson, I-want-to-go moments: From search to store. https://www.thinkwithgoogle.com/articles/i-want-to-go-micro-moments.html, Apr. 2015, 7 pgs.

Li, F., and Jagadish, H. V. Constructing an interactive natural language interface for relational databases. Proc. VLDB Endow. 8, 1 (Sep. 2014), 12 pgs.

Microsoft Q & A. https://powerbi.microsoft.com/en-us/documentation/powerbi-service-q-and-a/, Mar. 14, 2017, 5 pgs.

Montello, D., Goodchild, M., Gottsegen, J., and Fohl, P. Where's downtown? behavioral methods for determining referents for vague spatial queries. Spatial Cognition and Computation 3, 2&3 (2003), 20 pgs.

NarrativeScience, Turn your data into better decisions with Quill, https://www.narrativescience.com/quill, downloaded on May 9, 2017, 12 pgs.

(56) References Cited

OTHER PUBLICATIONS

Ng, H. T., and Zelle, J. Corpus-based approaches to semantic interpretation in natural language processing. AI Magazine Winter 1997, (1997), 20 pgs.
Node.js®. https://nodejs.org/, downloaded on May 10, 2017, 1 pg.
Oviatt, S., and Cohen, P. Perceptual user interfaces: Multimodal interfaces that process what comes naturally. Commun. ACM 43, 3 (Mar. 2000), 9 pgs.
Parr, T. The Definitive ANTLR 4 Reference, 2nd ed. Pragmatic Bookshelf, 2013, 322 pgs.
Pedersen, T., Patwardhan, S., and Michelizzi, J. Wordnet::similarity: Measuring the relatedness of concepts. In Demonstration Papers at HLT-NAACL 2004, HLT-NAACL—Demonstrations '04, Association for Computational Linguistics (Stroudsburg, PA, USA, 2004), 2 pgs.
Popescu, A.-M., Etzioni, O., and Kautz, H. Towards a theory of natural language interfaces to databases. In Proceedings of the 8th International Conference on Intelligent User Interfaces, IUI '03, ACM (New York, NY, USA, 2003), 9 pgs.
Pustejovsky, J., Castaño, J., Ingria, R., Saurí, R., Gaizauskas, R., Setzer, A., and Katz, G. TimeML: Robust specification of Event and temporal expressions in text. In in Fifth International Workshop on Computational Semantics (IWCS-5 (2003), 7 pgs.
Reinhart, T. Pragmatics and Linguistics: An Analysis of Sentence Topics. IU Linguistics Club publications. Reproduced by the Indiana University Linguistics Club, 1982, 5 pgs.
Setlur, Pre-Interview First Office Action dated Jul. 5, 2018, received in U.S. Appl. No. 15/486,265, 5 pgs.
Setlur, First Action Interview Office Action dated Aug. 29, 2018, received in U.S. Appl. No. 15/486,265, 6 pgs.
Setlur, Final Office Action dated Apr. 25, 2019, received in U.S. Appl. No. 15/486,265, 15 pgs.
Setlur, Notice of Allowance dated Sep. 6, 2019, received in U.S. Appl. No. 15/486,265, 13 pgs.
Setlur, Pre-Interview First Office Action dated Sep. 6, 2019, received in U.S. Appl. No. 15/804,991, 4 pgs.
Setlur, First Action Interview Office Action dated Oct. 29, 2019, received in U.S. Appl. No. 15/804,991, 6 pgs.
Setlur, Final Office Action, U.S. Appl. No. 15/804,991, dated Mar. 4, 2020, 14 pgs.
Setlur, Notice of Allowance, U.S. Appl. No. 15/804,991, dated Jul. 1, 2020, 15 pgs.
Setlur, Preinterview 1st Office Action, U.S. Appl. No. 15/978,062, dated Mar. 6, 2020, 4 pgs.
Setlur, Notice of Allowance, U.S. Appl. No. 15/978,062, dated May 29, 2020, 19 pgs.
Setlur, Office Action, U.S. Appl. No. 15/978,066, dated Mar. 18, 2020, 23 pgs.
Setlur, Final Office Action, U.S. Appl. No. 15/978,066, dated Aug. 19, 2020, 22 pgs.
Setlur, Office Action, U.S. Appl. No. 15/978,067, dated Feb. 21, 2020, 20 pgs.
Setlur, Final Office Action, U.S. Appl. No. 15/978,067, dated Aug. 5, 2020, 19 pgs.
Setlur et al., Eviza: A Natural Language Interface for Visual Analysis, ACM Oct. 16, 2016, 13 pgs.
Sun, Y., L. J. J. A., and Di Eugenio, B. Articulate: Creating meaningful visualizations from natural language. In Innovative Approaches of Data Visualization and Visual Analytics, IGI Global, Hershey, PA (2014), 20 pgs.
Tableau, Communication Pursuant to Rules 161(1) and 162, EP18729514.2, dated Jun. 17, 2019, 3 pgs.
Tableau Software, Inc., International Search Report and Written Opinion, PCT/US2018/030959, dated Sep. 14, 2018, 13 pgs.
Tableau Software, Inc., International Preliminary Report on Patentability, PCT/US2018/030959, dated Nov. 5, 2019, 11 pgs.
Tableau, Extended European Search Report, EP18729514.2, dated Mar. 4, 2020, 4 pgs.
Tableau Software Inc., International Search Report and Written Opinion, PCT/US2019/047892, dated Mar. 4, 2020, 24 pgs.
ThoughtSpot. Search-Driven Analytics for Humans, http://www.thoughtspot.com/, downloaded May 9, 2017, 9 pgs.
Turf: Advanced geospatial analysis for browsers and node. http://turfjs.org, downloaded May 9, 2017, 2 pgs.
Wikipedia, Extended Backus-Naur Form. https://en.wikipedia.org/wiki/Extended_Backus%E2%80%93Naur_Form, last edited on Jan. 7, 2017, 7 pgs.
Winograd, T. Procedures as a Representation for Data in a Computer Program for Understanding Natural Language. PhD thesis, Feb. 1971, 472 pgs.
WolframAlpha. Professional-grade computational, https://www.wolframalpha.com/, downloaded May 9, 2017, 25 pgs.
Wu, Z., and Palmer, M. Verbs semantics and lexical selection. In Proceedings of the 32nd Annual Meeting on Association for Computational Linguistics, ACL '94, Association for Computational Linguistics (Stroudsburg, PA, USA, 1994), 6 pgs.
Ericson, Final Office Action, U.S. Appl. No. 16/680,431, dated May 19, 2021, 22 pgs.
Ericson, Notice of Allowance, U.S. Appl. No. 16/134,892, dated Mar. 9, 2021, 11 pgs.
Ericson, Office Action, U.S. Appl. No. 16/601,437, dated Jun. 24, 2021, 15 pgs.
Ericson, Office Action, U.S. Appl. No. 16/680,431, dated Nov. 10, 2021, 22 pgs.
Ericson, Final Office Action, U.S. Appl. No. 16/601,437, dated Nov. 12, 2021, 17 pgs.

\* cited by examiner

Analytical Expressions 238
- Aggregation Expressions 240
- Group Expressions 242
- Filter Expressions 244
- Limit Expressions 246
- Sort Expressions 248
- ⋮

Figure 2B

Grammar Lexicon 262
- Analytical Concepts 266
  - Fields 268
  - Values 270
  - Aggregation Operators 272
  - Group Operators 274
  - Filter Operators 276
  - Limit Operators 278
  - Sort Operators 280
  - ⋮
- ⋮

Figure 2C

Data Source 1 Lexicon 264-1

Table Names 282

Data Field 1 284-1

Data Field Name 285-1

Data Type 286-1

Concepts 288-1

Synonyms 290-1

Aliases 292-1

Data Values 294-1

⋮

Data Field 2 284-2

Data Field Name 285-2

Data Type 286-2

Concepts 288-2

Synonyms 290-2

Aliases 292-2

Data Values 294-2

⋮

⋮

Other Database Objects 296

Figure 4D Inset

VISUALLY CORRELATING INDIVIDUAL TERMS IN NATURAL LANGUAGE INPUT TO RESPECTIVE STRUCTURED PHRASES REPRESENTING THE NATURAL LANGUAGE INPUT

RELATED APPLICATIONS

This application is related to the following applications, each of which is incorporated by reference herein in its entirety:

(i) U.S. patent application Ser. No. 15/486,265, filed Apr. 12, 2017, entitled "Systems and Methods of Using Natural Language Processing for Visual Analysis of a Data Set," now U.S. Pat. No. 10,515,121;

(ii) U.S. patent application Ser. No. 15/804,991, filed Nov. 6, 2017, entitled "Systems and Methods of Using Natural Language Processing for Visual Analysis of a Data Set";

(iii) U.S. patent application Ser. No. 15/978,062, filed May 11, 2018, entitled "Applying Natural Language Pragmatics in a Data Visualization User Interface";

(iv) U.S. patent application Ser. No. 15/978,066, filed May 11, 2018, entitled "Data Visualization User Interface Using Cohesion of Sequential Natural Language Commands";

(v) U.S. patent application Ser. No. 15/978,067, filed May 11, 2018, entitled "Updating Displayed Data Visualizations According to Identified Conversation Centers in Natural Language Commands";

(vi) U.S. patent application Ser. No. 16/219,406, filed Dec. 13, 2018, entitled "Identifying Intent in Visual Analytical Conversations";

(vii) U.S. patent application Ser. No. 16/134,892, filed Sep. 18, 2018, entitled "Analyzing Natural Language Expressions in a Data Visualization User Interface";

(viii) U.S. patent application Ser. No. 16/134,907, filed Sep. 18, 2018, entitled "Natural Language Interface for Building Data Visualizations, Including Cascading Edits to Filter Expressions";

(ix) U.S. patent application Ser. No. 16/166,125, filed Oct. 21, 2018, entitled "Determining Levels of Detail for Data Visualizations Using Natural Language Constructs";

(x) U.S. patent application Ser. No. 16/234,470, filed Dec. 27, 2018, entitled "Analyzing Underspecified Natural Language Utterances in a Data Visualization User Interface";

(xi) U.S. patent application Ser. No. 16/601,437, filed Oct. 14, 2019, entitled "Incremental Updates to Natural Language Expressions in a Data Visualization User Interface";

(xii) U.S. patent application Ser. No. 16/680,431, filed Nov. 11, 2019, entitled "Using Refinement Widgets for Data Fields Referenced by Natural Language Expressions in a Data Visualization User Interface";

(xiii) U.S. patent application Ser. No. 14/801,750, filed Jul. 16, 2015, entitled "Systems and Methods for using Multiple Aggregation Levels in a Single Data Visualization";

(xiv) U.S. patent application Ser. No. 16/681,754, filed Nov. 12, 2019, entitled "Using Natural Language Expressions to Define Data Visualization Calculations that Span Across Multiple Rows of Data from a Database"; and (xv) U.S. patent application Ser. No. 17/026,113, filed Sep. 18, 2020, entitled "Using Dynamic Entity Search during Entry of Natural Language Commands for Visual Data Analysis."

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

SUMMARY

The use of natural language expressions to generate data visualizations provides a user with greater accessibility to data visualization features, including updating the fields and changing how the data is filtered. A natural language interface enables a user to develop valuable data visualizations with little or no training.

There is a need for improved systems and methods that support and refine natural language interactions with visual analytical systems. The present disclosure describes data visualization platforms that improve the effectiveness of natural language interfaces by resolving natural language utterances as they are being input by a user of the data visualization platform. Unlike existing interfaces that require natural language inputs to be composed of complete words and/or phrases, the present disclosure describes a natural language interface that provides feedback (e.g., generates interpretations, analytical expressions, and/or correlates interpretations and input query terms) in response to each term that is input by the user.

The disclosed natural language interface automatically annotates a term in a natural language utterance when the interface determines with certain confidence that the term should be interpreted as a particular entity in the data source. The disclosed natural language interface also resolves ambiguities in natural language utterances by visually correlating how a term in a natural language input maps to respective analytical expressions or phrases corresponding to the interpretation. Once a term is automatically annotated, the data visualization platform displays analytical expressions or phrases corresponding to the interpretation. The data visualization platform also visually emphasizes a term and its corresponding phrases (e.g., by simultaneously pulsing the term and its corresponding phrases). The data visualization platform also visually de-emphasizes other terms in the natural language input that are not recognized by the platform, thereby informing the user that these other terms are not required in the natural language command. Accordingly, such methods and interfaces reduce the cognitive burden on a user and produce a more efficient human-machine interface. For battery-operated devices, such methods and interfaces conserve power and increase the time between battery charges. Such methods and interfaces may complement or replace conventional methods for visualizing data. Other implementations and advantages may be apparent to those skilled in the art in light of the descriptions and drawings in this specification.

In accordance with some implementations, a method is performed at a computing device. The computing device has a display, one or more processors, and memory. The memory stores one or more programs configured for execution by the one or more processors. The computing device receives from a user a partial natural language input related to a data source. The partial natural language input includes a most recently entered first term. In response to receiving the first term, the computing device generates a first token that includes the first term. The computing device maps the first token to one or more analytical concepts in a lexicon of the data source. The computing device determines a first interpretation corresponding to the first token. The computing device also displays a first phrase corresponding to the first interpretation. The first phrase includes the first term.

In some implementations, generating the first token includes concatenating the first term with another term that immediately precedes the first term in the partial natural language input.

In some implementations, generating the first token includes concatenating the first term with another term that immediately follows the first term in the partial natural language input.

In some implementations, the first phrase includes an analytical concept corresponding to the first term.

In some implementations, displaying the first phrase further comprises simultaneously visually emphasizing the first term and the first phrase.

In some implementations, simultaneously visually emphasizing the first term and the first phrase includes simultaneously pulsing the first term and the first phrase.

In some instances, the partial natural language input consists of a plurality of terms including the first term. In some implementations, visually emphasizing the first term further comprises visually de-emphasizing one or more other terms in the plurality of terms.

In some instances, the visually de-emphasized one or more other terms include a second term. The computing device receives user selection of the second term. The computing device also receives user input specifying a data field name of a data field from the data source. In response to the user input, the computing device stores the second term as a synonym of the data field name.

In some instances, after the storing, the computing device receives from the user a second partial natural language command. The second partial natural language command includes the second term. In response to receiving the second term, the computing device displays a second phrase corresponding to the second term. The second phrase includes the data fieldname stored as a synonym of the second term.

In some implementations, the partial natural language input is received in a first region of a graphical user interface. The first phrase is displayed in a second region of the graphical user interface, distinct from the first region.

In some implementations, after determining the first interpretation corresponding to the first token, the computing device assigns a first index to the first token. The computing device also generates a data structure that includes the first index and the first token.

In some instances, the computing device receives additional user input to the partial natural language input. In some implementations, the additional user input includes a third term. In response to receiving the third term, the computing device generates a third token that includes the third term. The computing device maps the third token to one or more analytical concepts in the lexicon. The computing device determines a third interpretation corresponding to the third token. The computing device also displays in the graphical user interface a third phrase corresponding to the third interpretation.

In some instances, after the computing device determines the first interpretation, the computing device persists the first interpretation. The third interpretation includes the first interpretation.

In some instances, the computing device receives a user interaction with the first term. In some implementations, in response to the user interaction, the computing device maintains visual display of the first phrase while visually de-emphasizing the third phrase.

In some implementations, a computing device includes one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 2A-2D are block diagrams of a computing device according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Some methods and devices disclosed in the present specification improve upon data visualization methods by generating and displaying interpretations in response to each subsequent additional keystroke of a partial natural language command (e.g., a command that contains incomplete words, phrases, and/or sentences). In response to a determination that a term in the natural language utterance matches a particular entity (e.g., with a certain level of confidence), the data visualization application automatically annotates a term in the natural language command, which in turn instructs a data visualization application to interpret the term as the particular entity in the data source. Such methods and devices improve user interaction with the natural language interface by providing quicker and easier incremental updates to natural language expressions related to a data visualization. Database "entities" include data field names, table names, and data values. Entities also include natural language keywords and keywords that express database semantics. As used herein, "annotating" a term entails assigning a specific meaning to the term. Terms that are not annotated can have their interpretations updated as a user enters more terms or modifies existing terms.

Some methods and devices disclosed in the present specification improve upon data visualization methods by generating and displaying how a term in a natural language input maps to respective analytical expressions or phrases corresponding to the interpretation.

Figure 1:
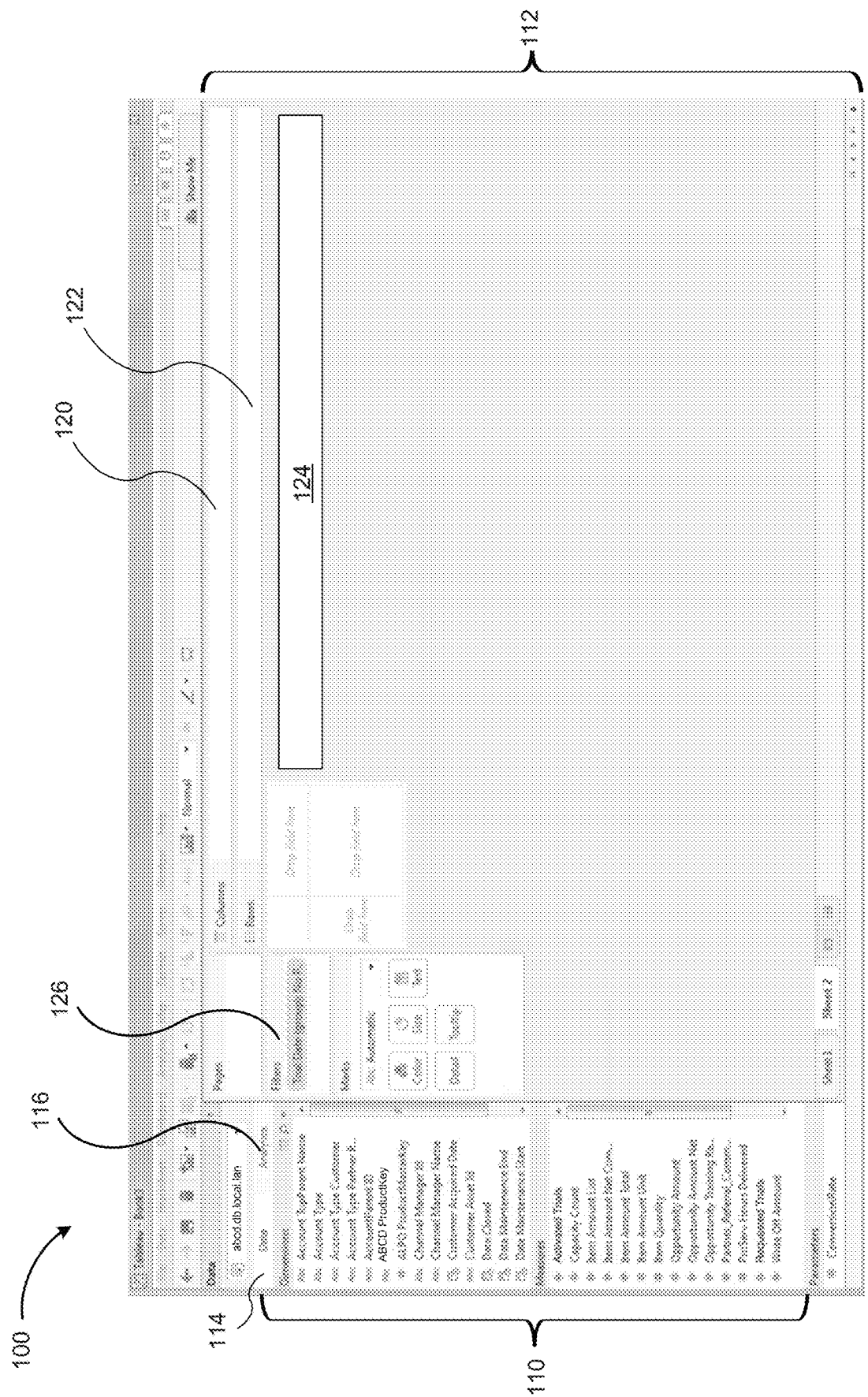
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2A:
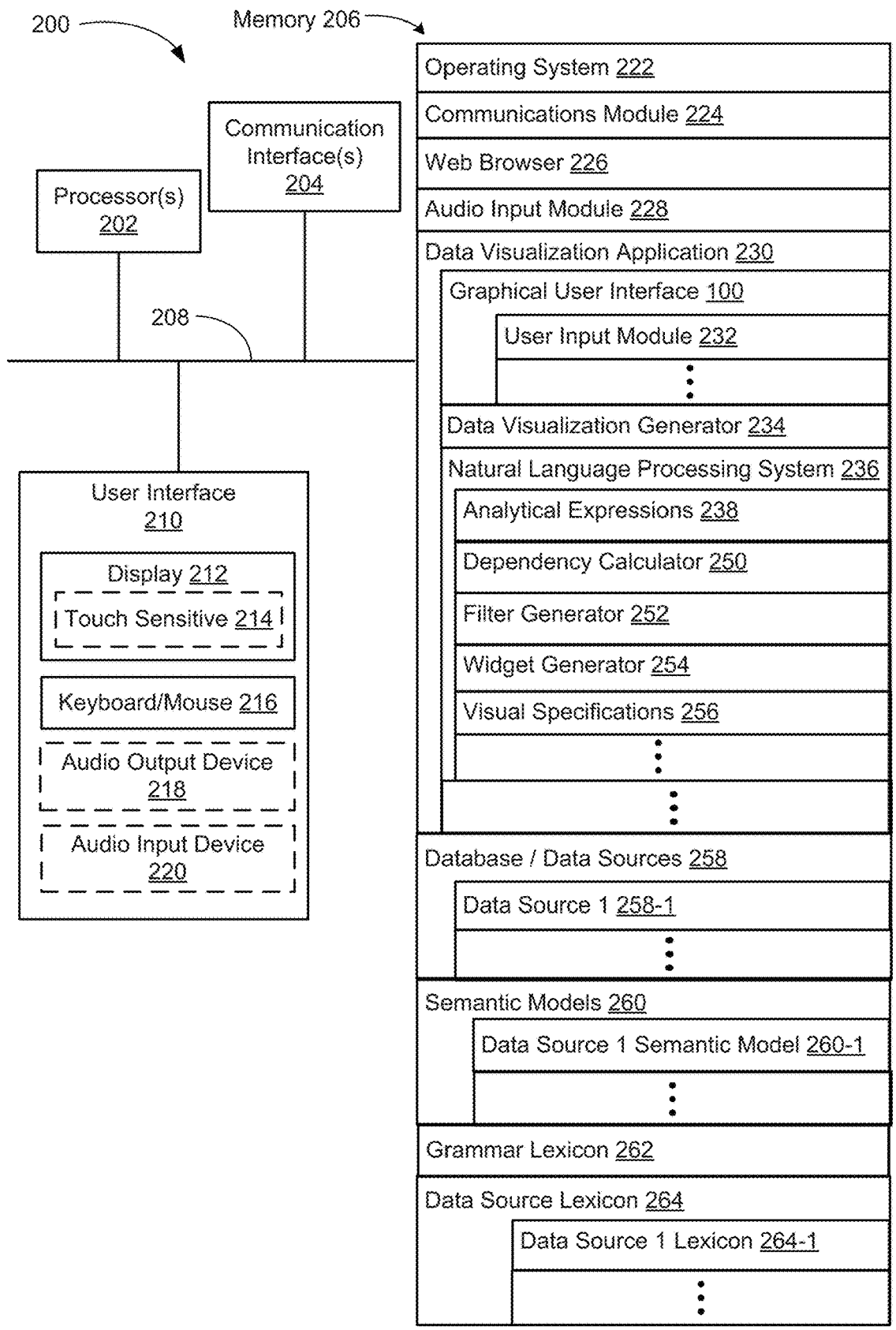

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. In some implementations, the communication buses 208 include circuitry (sometimes called a chipset) that interconnects and controls communications between system components.

The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/ double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices. In some implementations, the memory 206 includes non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230 or the natural language system 236);
- a data visualization application 230, which generates data visualizations and related features. In some implementations, the data visualization application 230 includes:
  - a graphical user interface 100 for a user to construct visual graphics. In some implementations, the graphical user interface includes a user input module 232 for receiving user input through the natural language box 124. For example, a user inputs a natural language command or expression into the natural language box 124 identifying one or more data sources 258 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
  - a data visualization generator 234, which automatically generates and displays a corresponding visual graphic (also referred to as a "data visualization" or a "data viz") using the user input (e.g., the natural language input);
  - a natural language system 236, which receives and parses the natural language input provided by the user. The natural language system 236 may identify analytical expressions 238, which are described in FIG. 2B.
  - the natural language system 236 may also include a dependency calculator 250, which looks up dependencies in a database 258 to determine how particular terms and/or phrases are related (e.g., dependent);
  - in some implementations, the natural language system 236 includes a filter generator 252, which determines if one or more filters are related to a field that has been modified by a user. The filter generator 252 generates the one or more filters based on user selections;
  - a widget generator 254, which generates widgets that include user-selectable options. For example, a "sort" widget is generated in response to a user selecting (e.g., hovering) over a sort field (e.g., a natural language term identified to be a sort field). The sort widget includes user-selectable options such as "ascending," "descending," and/or "alphabetical," so that the user can easily select, from the widget, how to sort the selected field; and
  - visual specifications 256, which are used to define characteristics of a desired data visualization. In some implementations, the information the user provides (e.g., user input) is stored as a visual specification. In some implementations, the visual specifications 256 include previous natural language commands received from a user or properties specified by the user through natural language commands. In some instances, a visual specification 256 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," and U.S. patent application Ser. No. 16/166,125, filed Oct. 21, 2018, titled "Determining Levels of Detail for Data Visualizations Using Natural Language Constructs," each of which is incorporated by reference herein in its entirety; and
- zero or more databases or data sources 258 (e.g., a first data source 258-1), which are used by the data visualization application 230. In some implementations, the data sources are stored as spreadsheet files, CSV files, XML files, flat files, or JSON files, or stored in a relational database. For example, a user selects one or more databases or data sources 258 (which may be stored on the computing device 200 or stored remotely), selects data fields from the data source(s), and uses the selected fields to define a visual graphic.
- zero or more semantic models 260 (e.g., a first semantic model 260-1), each of which is derived directly from a respective database or data source 258. The semantic model 260 represents the database schema and contains metadata about attributes (e.g., data fields). In some implementations, the semantic model 260 also includes metadata of alternative labels or synonyms of the attributes. The semantic model 260 includes data types (e.g., "text," "date," "geospatial," "Boolean," and "numeric"), attributes (e.g., a currency type such as the United States Dollar), and a semantic role (e.g., the "City" role for a geospatial attribute) for data fields of the respective database or data source 258. In some implementations, the semantic model 260 also captures statistical values (e.g., data distribution, range limits, average, and cardinality) for each attribute. In some implementations, the semantic model 260 is augmented with a grammar lexicon 262, which contains a set of analytical concepts 266 found in many query languages (e.g., average, filter, and sort). In some implementations, the semantic model 260 also distinguishes between attributes that are measures (e.g., attributes that can be measured, aggregated, or used for mathematical operations) and dimensions (e.g., fields that cannot be aggregated except by counting). Thus, the semantic model 260 helps with inferencing and choosing salient attributes and values;

a grammar lexicon 262, which includes analytical concepts 266 (see FIG. 2C) that are used to support the analytical expressions 238 for forming intermediate expressions; and zero or more data source lexicons 264 (e.g., a first data source lexicon 264-1), each of which is associated with a respective database or data source 258. Details of the components of a data source lexicon are described in FIG. 2D.

In some implementations the computing device 200 further includes an inferencing module (not shown), which is used to resolve underspecified (e.g., omitted information) or ambiguous (e.g., vague) natural language commands (e.g., expressions or utterances) directed to the databases or data sources 258, using one or more inferencing rules. Further information about the inferencing module can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

In some implementations, canonical representations are assigned to the analytical expressions 238 (e.g., by the natural language system 236) to address the problem of proliferation of ambiguous syntactic parses inherent to natural language querying. The canonical structures are unambiguous from the point of view of the parser and the natural language system 236 is able to choose quickly between multiple syntactic parses to form intermediate expressions. Further information about the canonical representations can be found in U.S. patent application Ser. No. 16/234,470, filed Dec. 27, 2018, titled "Analyzing Underspecified Natural Language Utterances in a Data Visualization User Interface," which is incorporated by reference herein in its entirety.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

FIG. 2B is block diagram illustrating the analytical expressions 238 of the natural language system 236, in accordance with some implementations. The analytical expressions 238 include:

aggregation expressions 240. For example, "average Sales" is an aggregate expression that includes an aggregate term "average" and an attribute "Sales." In some implementations, the aggregation expressions 240 are in the canonical form [agg att], where agg∈Aggregations and att is an Attribute (i.e., a data field);

group expressions 242. For example, "by Region" is a group expression that includes a group term "by" and an attribute "Region." In some implementations, the group expressions 242 are in the canonical form [grp att], where grp∈Groups and att is an attribute;

filter expressions 244. For example, "Customer Name starts with John" is a filter expression that contains an attribute "Customer Name," a filter "starts with," and a value "John." In some implementations, the filter expressions 244 are in the canonical form [att filter val], where att is an attribute, filter∈Filters, and val E Values;

limit expressions 246. For example, "top 5 Wineries by sum of Sales" is a limit expression that contains a limit term "top", a value "5", a group by attribute "Wineries," and an aggregation expression "sum of Sales." In some implementations, the limit expressions 246 are in the canonical form [limit val ge ae], where limit E Limits, val∈Values, ge∈group expressions, and ae∈aggregation expressions; and sort expressions 248. For example, in "sort Products in ascending order by sum of Profit," the phrase "ascending order" is the sort term, "Products" is the attribute to group by, and "sum of Profit" is the aggregation expression. In some implementations, the sort expressions 248 are in the canonical form [sort ge ae], where sort∈Sorts, ge∈group expressions, and ae∈aggregation expressions.

FIG. 2C is a block diagram illustrating components of a grammar lexicon 262 according to some implementations. In some implementations, the grammar lexicon comprises analytical concepts 266 that support the formation of analytical expressions 238. The analytical concepts 266 include:

data fields 268, which are database fields. Examples of field concepts include "Sales," and "Product Category";

data values 270, which are data values for database fields. Examples of value concepts include the value 10,500,000.00 for a Sales data field and the value "Chairs" for a Product Category data field;

aggregation operators 272, which are operators that aggregate the values of multiple rows to form a single value based on a mathematical operation. Examples of aggregation concepts include "sum," "average," "median," "count," and "distinct count";

group operators 274, which are operators that partition the data into categories. An example of a group concept is the "by" key value;

filter operators 276, which are operators that return a subset of rows from the database. Examples of filter concepts include "filter to," "at least," "between," and "at most";

limit operators 278, which are operators (akin to the filters 276) that return a subset of rows from the database, restricting to n rows, where 1≤n≤N, and N is the total number of rows in the domain. Examples of limit concepts include "top" and "bottom"; and sort operators 280, which are operators that arrange data rows in a specific order. Examples of sort concepts include "ascending," "descending," and "alphabetical."

FIG. 2D is a block diagram illustrating components of a first data source lexicon 264-1, in accordance with some implementations. The first data source lexicon 264-1 includes table names 282 corresponding to names of one or more tables of the first data source 258-1, a plurality of data fields 284 of the first data source 258-1, and other database objects 296. Each data field 284 includes:

a data field name 285, which identifies the data field;

a data type 286, such as integer, string, date, or floating point numeric;

one or more concepts 288, which are used to interpret the data field. For example, a data value "Michael" may be interpreted using the concepts such as a "string," "name," "gender (e.g., male)," "singer," "basketball player," and/or "chef." In some implementations, the one or more concepts are derived from elastic searches;

zero or more synonyms 290, which are defined by the system. For example, a data field "average" may include synonyms such as "mean" and "avg";

zero or more aliases 292, which are defined by the user. For example, a data field "goods" may include aliases such as "widgets," "bananas," and "my favorite field"; and data values 294, which are some or all of the distinct values for a data field. This is particularly useful for low cardinality string data fields. In some instances, the set of stored data values 294 for a data field 284 in a lexicon 264 is limited to data values with threshold usage in the data field 284 (e.g., include a data value 294 in the lexicon when the data value appears in at least a threshold number of rows for the data field 284 or appears in a threshold percentage of the rows of the data field).

In some implementations, a data source lexicon 264 includes other database objects 296 as well.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these submodules are described in U.S. patent application Ser. No. 16/134,892, titled "Analyzing Natural Language Expressions in a Data Visualization User Interface, filed Sep. 18, 2018, which is incorporated by reference herein in its entirety.

Figure 3:
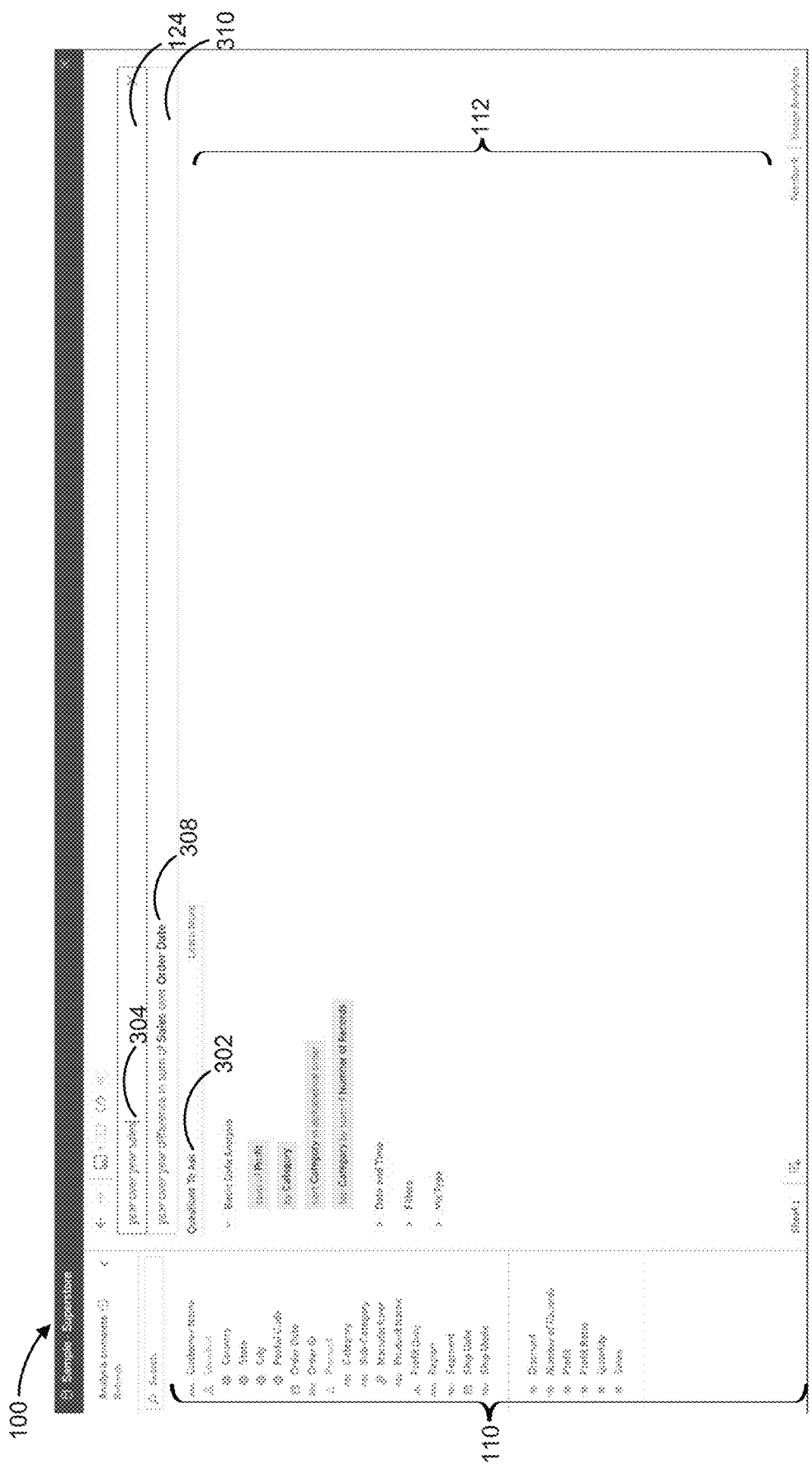
FIG. 3 provides a screenshot for a graphical user interface according to some implementations.

Each of the above identified executable modules, applications, or sets of procedures may be stored in one or more of the memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above FIG. 3 is a screen shot for a graphical user interface 100 according to some implementations. In some implementations, as illustrated in FIG. 3, the data visualization region 112 displays suggestions 302 (e.g., tips or pointers) to assist the user in interacting with the data source. Further details about the suggestions 302 are described in U.S. patent application Ser. No. 16/601,437, filed Oct. 14, 2019, entitled "Incremental Updates to Natural Language Expressions in a Data Visualization User Interface," which is incorporated by reference herein in its entirely.

In the example of FIG. 3, a user is interacting with a data source 258. The schema information region 110 provides named data elements (e.g., field names) from the data source 258, which may be selected and used to build a data visualization.

FIG. 3 illustrates a user interaction with the graphical user interface 100. In this example, the user inputs (e.g., enters or types) a natural language expression (e.g., a natural language command) 304 "year over year sales" in the command box 124. The user may also input the natural language expression by speech, which is then captured using an audio input device 220 (e.g. a microphone) coupled to the computing device 200. Typically, the natural language expression includes one or more terms that identify data fields from the data source 258. A term may be a dimension (e.g., categorical data) or a measure (e.g., a numerical quantity). As illustrated by the example, the natural language input typically includes one or more terms that correspond to database fields (e.g., the term "sales" identifies a data field from the data source).

In some implementations, parsing of the natural language expression is triggered in response to the user input. In this example, the natural language command 304 includes the terms "year over year," which specifies a table calculation type.

In response to the natural language command 304, the graphical user interface 100 displays an interpretation 308 (also referred to as a proposed action) in an interpretation box 310. In some implementations, as illustrated in FIG. 3, the field names "Sales" and "Order Date" are displayed in a visually distinctive manner (e.g., in boldface) relative to other words included in the interpretation 308.

Figure 4A:
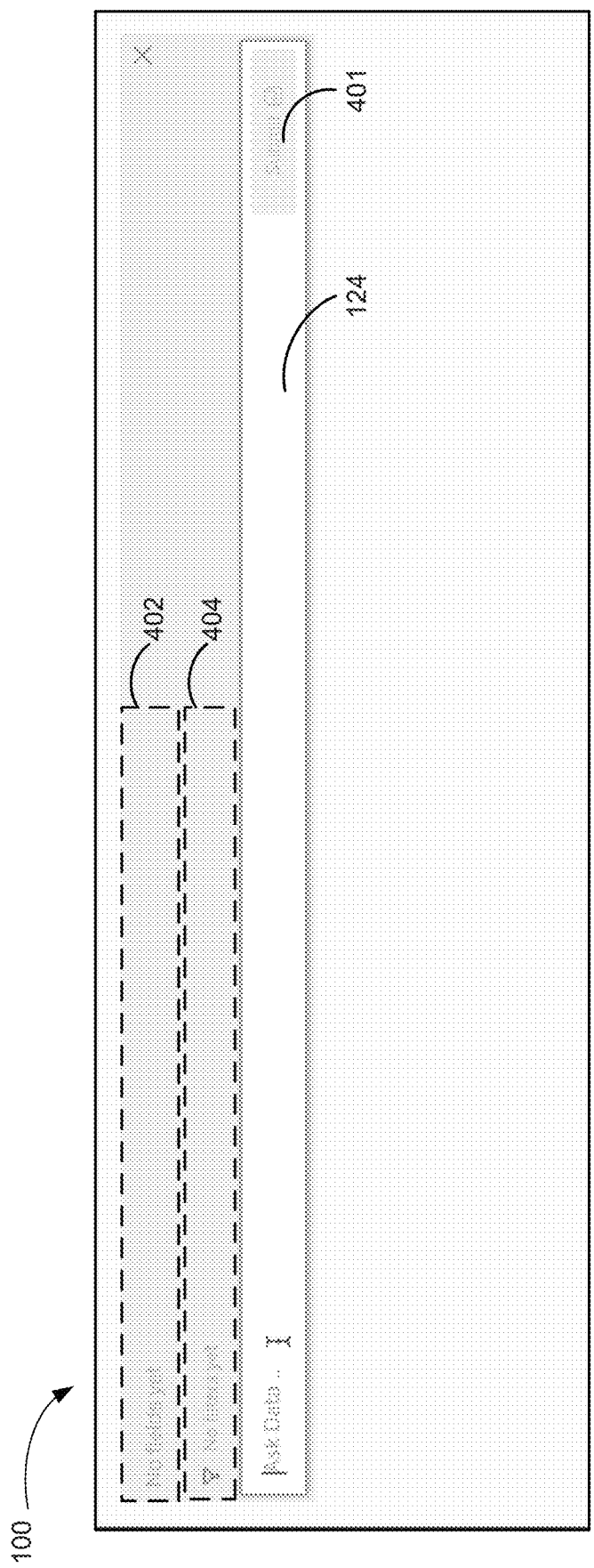
FIGS. 4A-4O provide a series of screen shots for interactions with a graphical user interface according to some implementations.
Figure 4B:
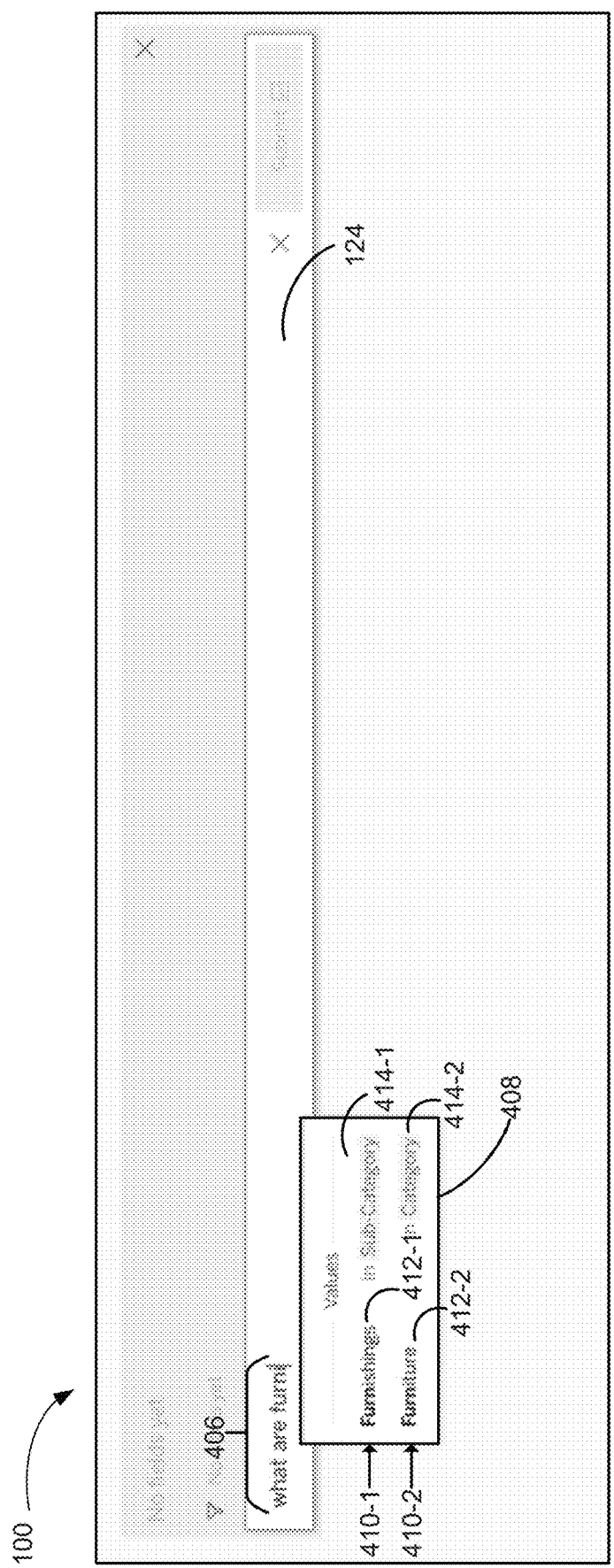
Figure 4C:
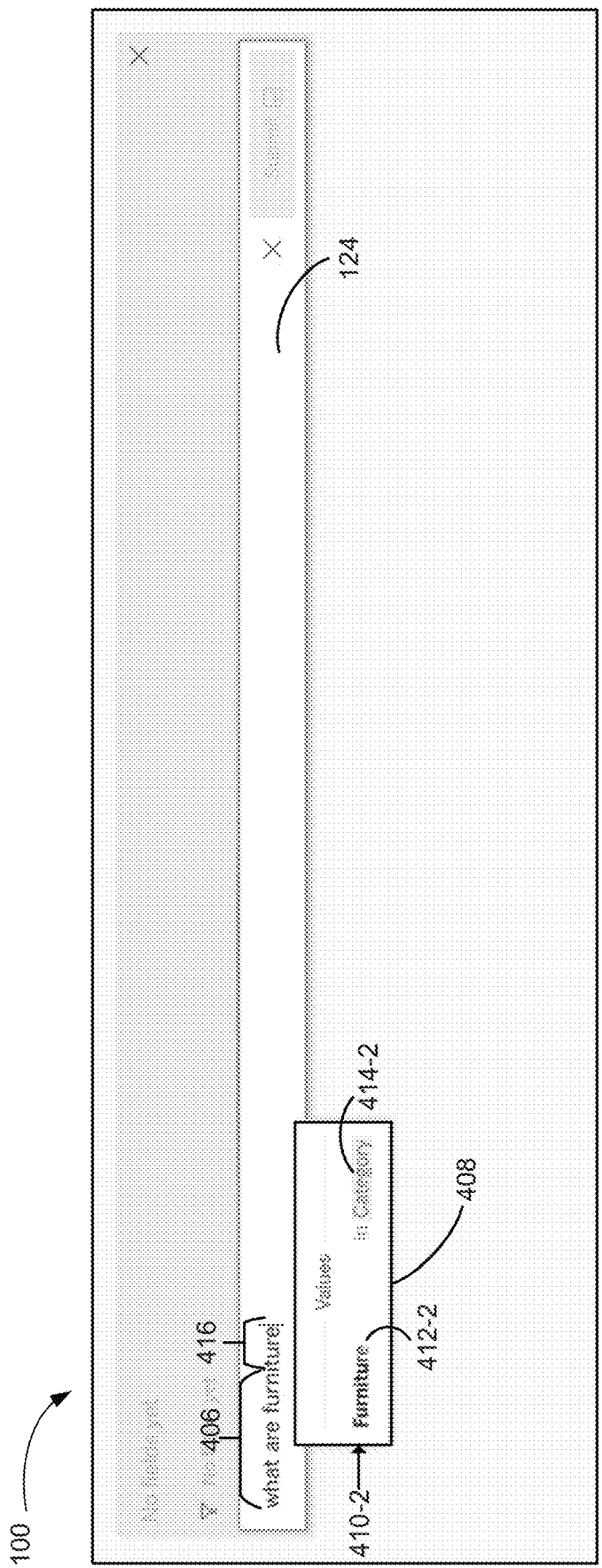
Figure 4D:
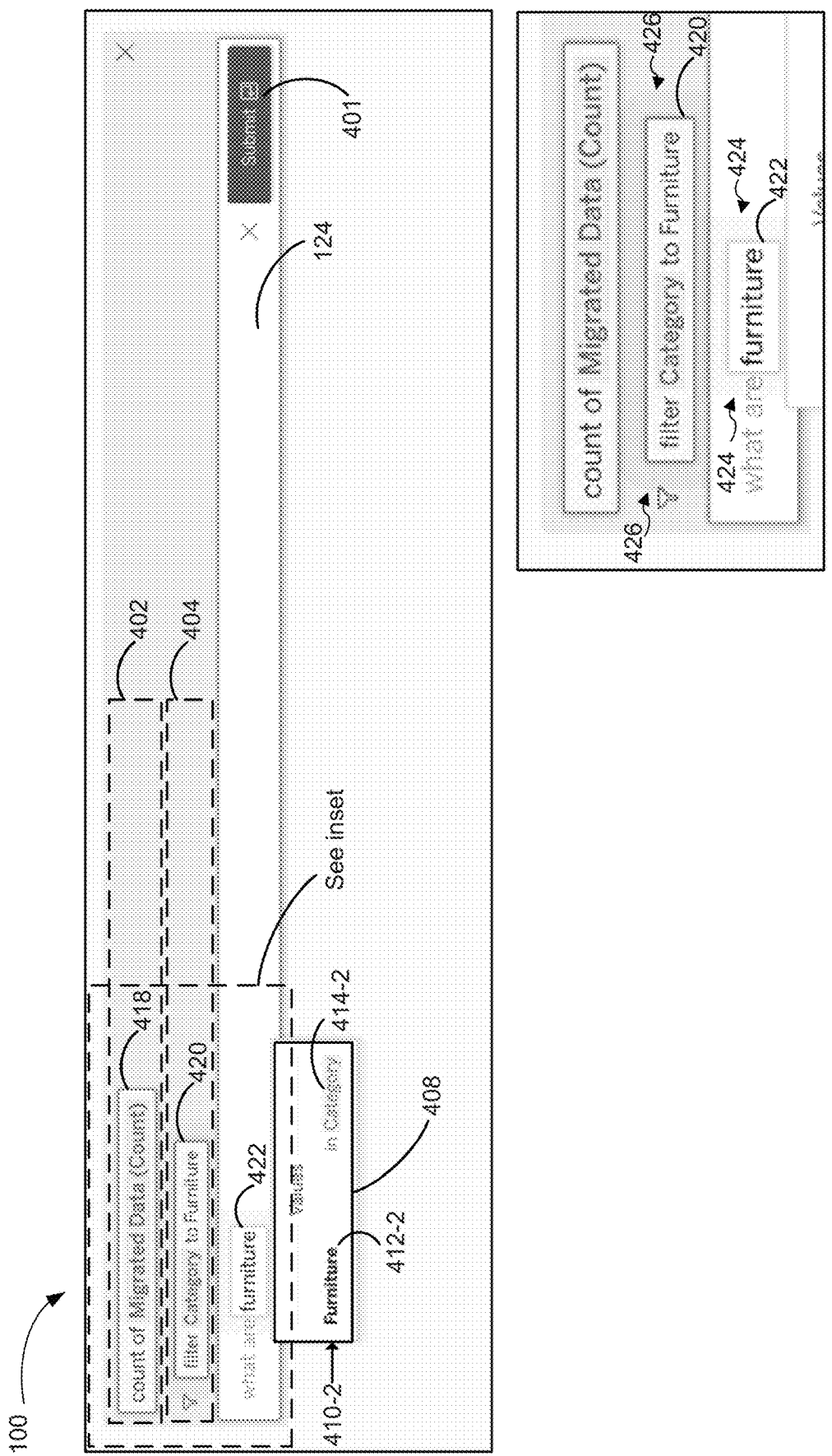
Figure 4E:
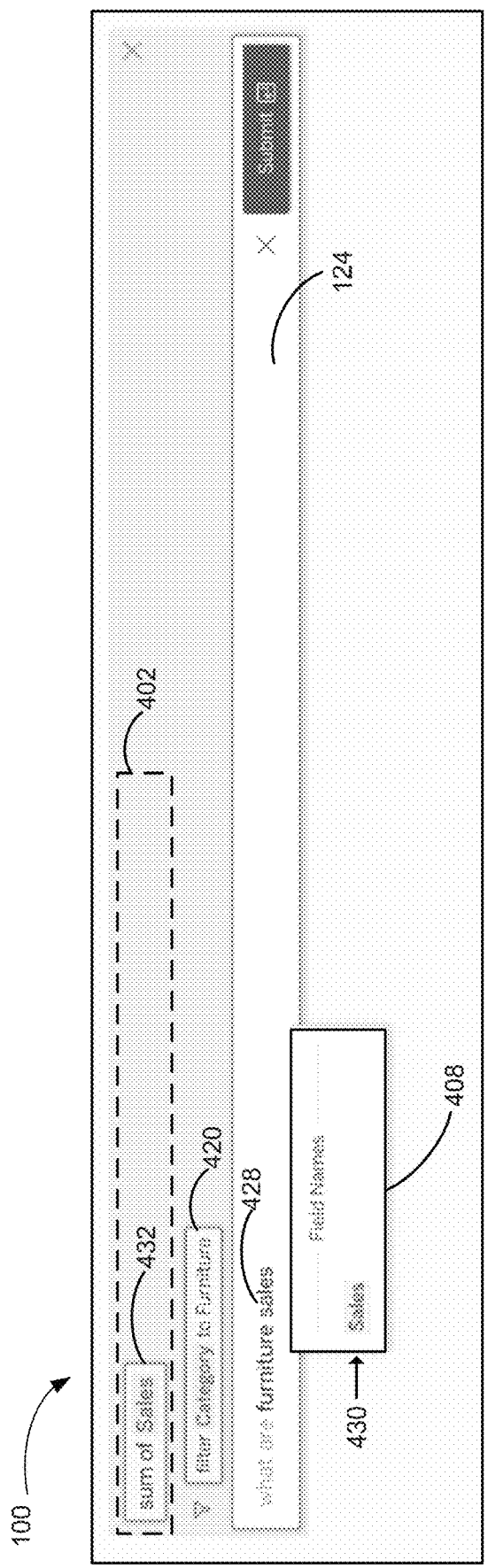
Figure 4F:
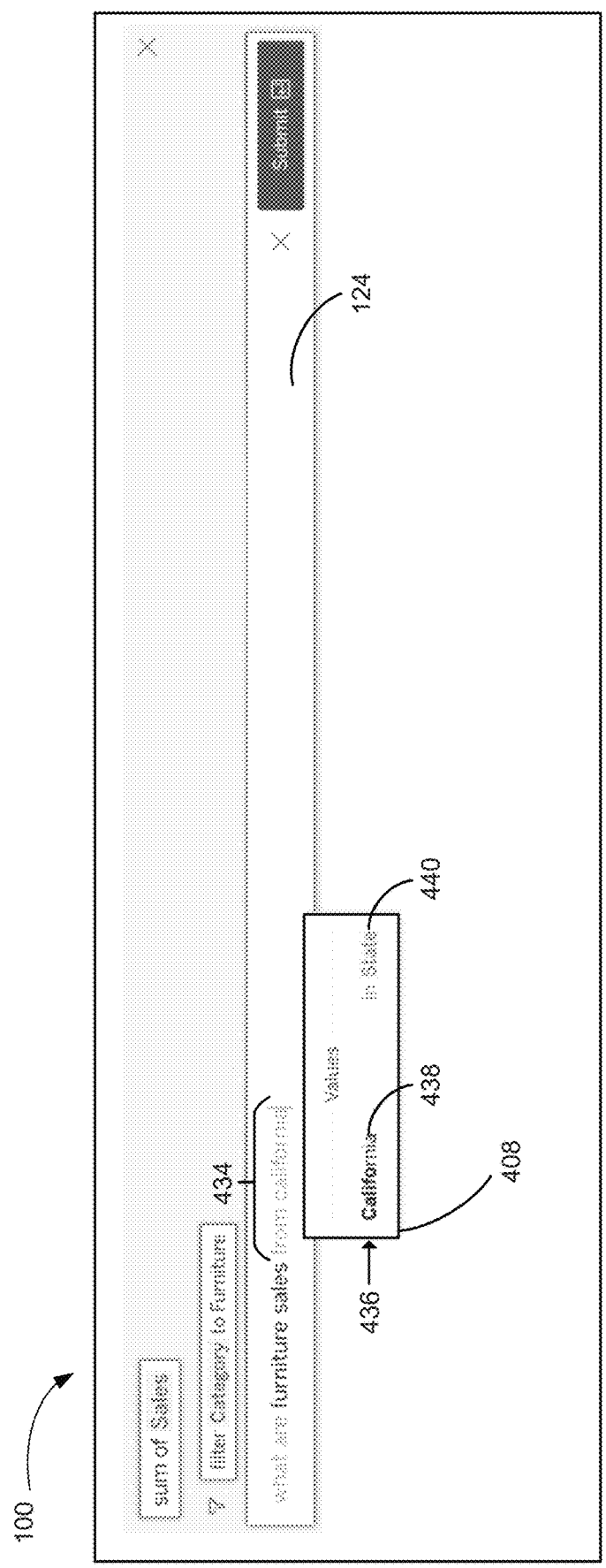
Figure 4G:
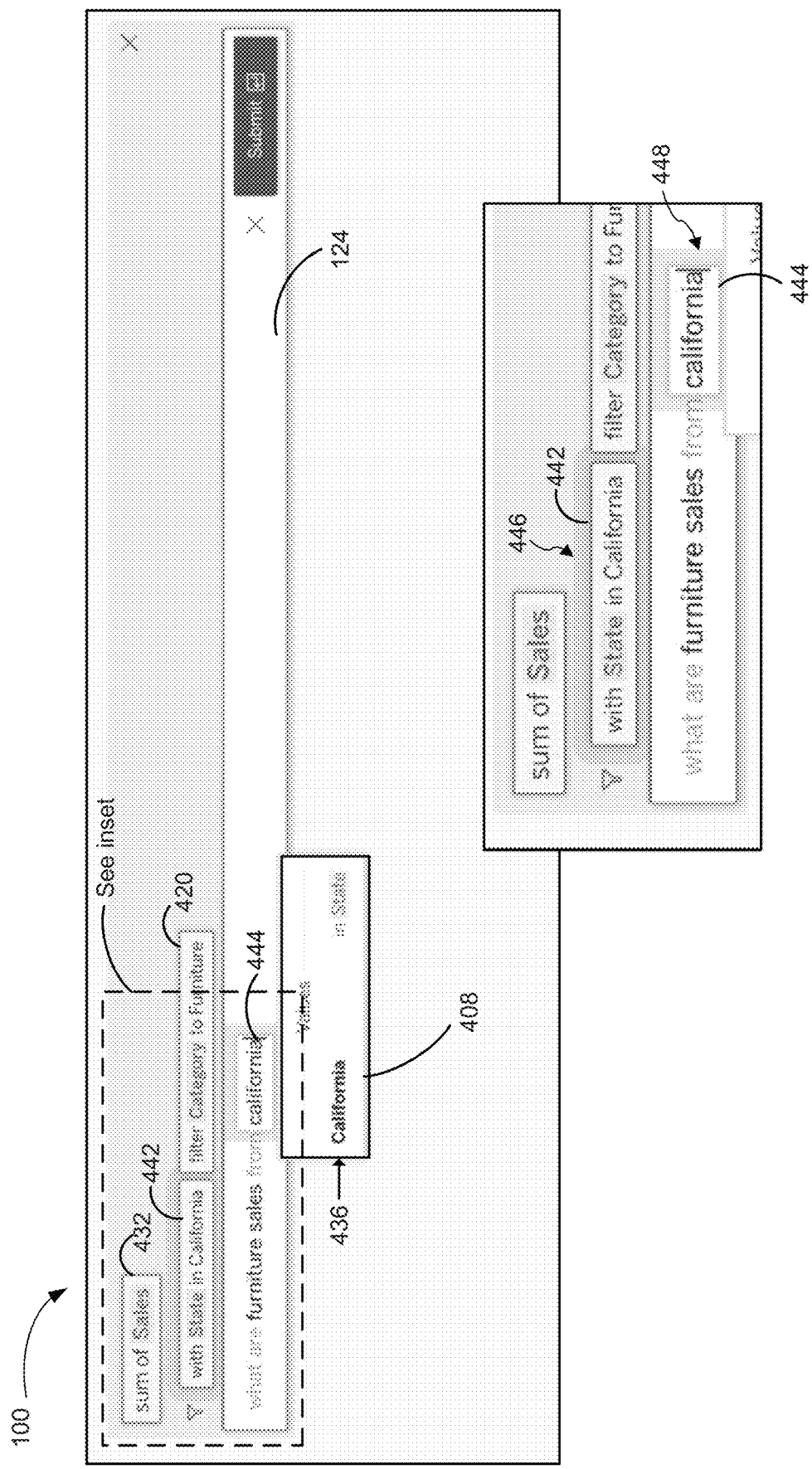
Figure 4H:
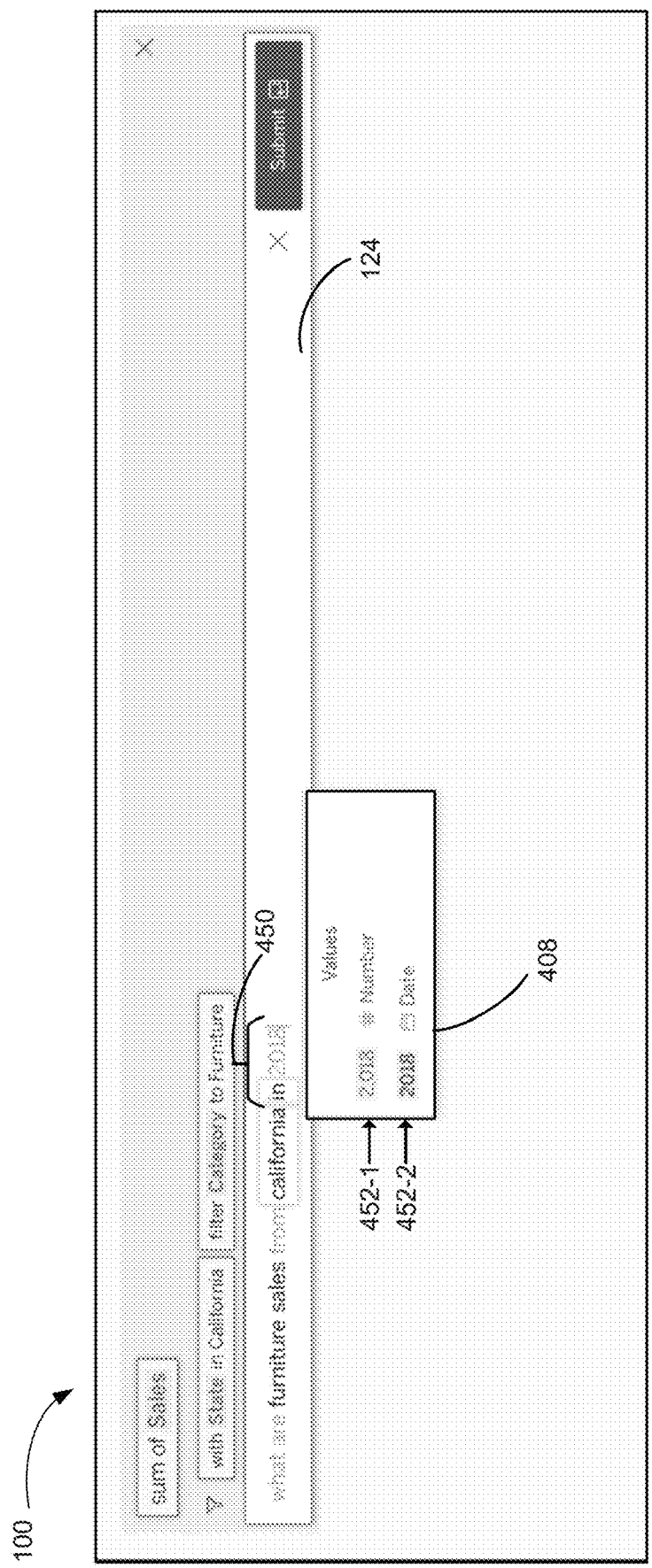
Figure 4I:
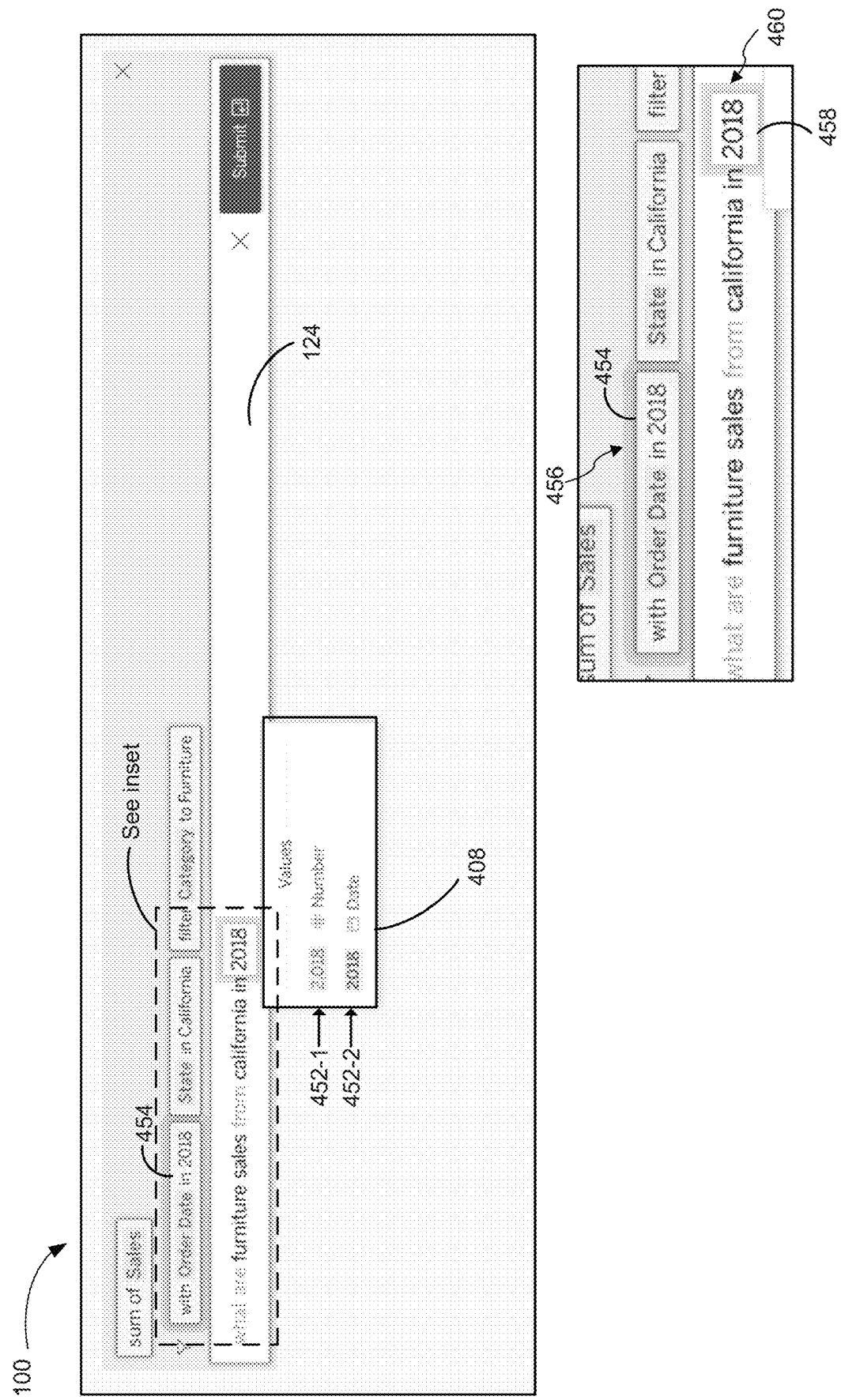
Figure 4J:
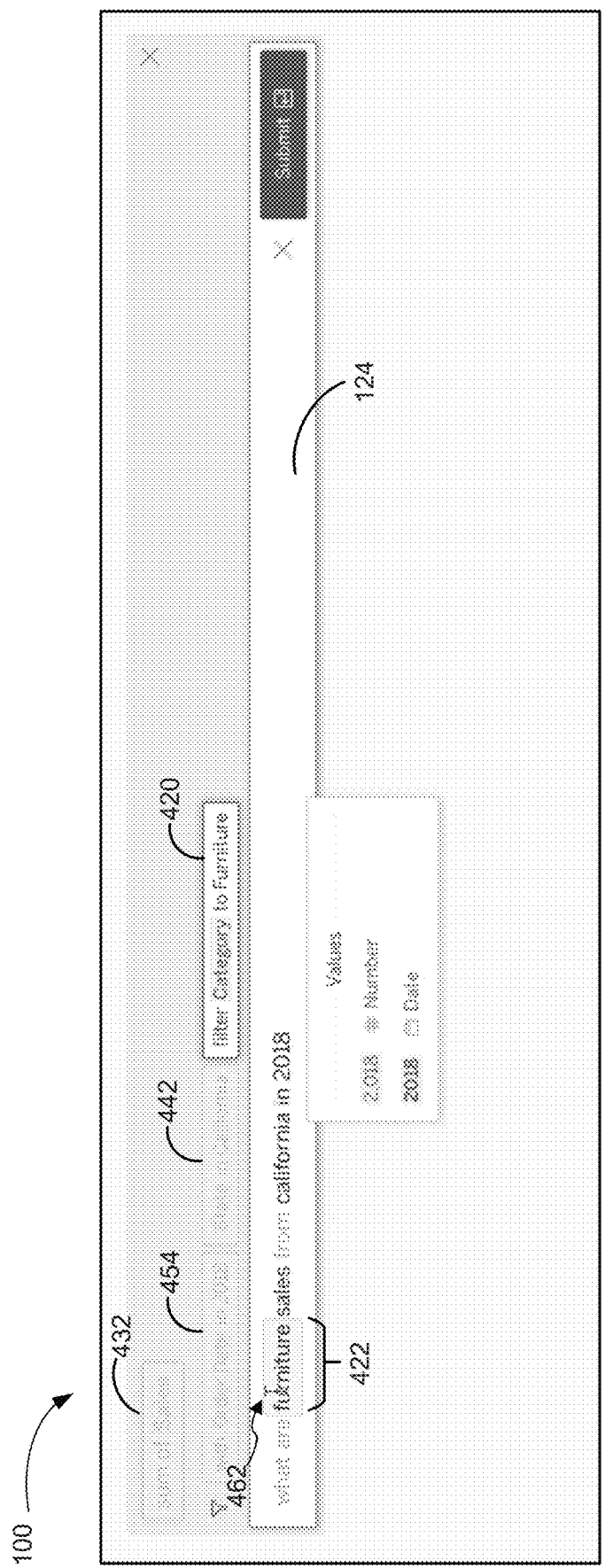
Figure 4K:
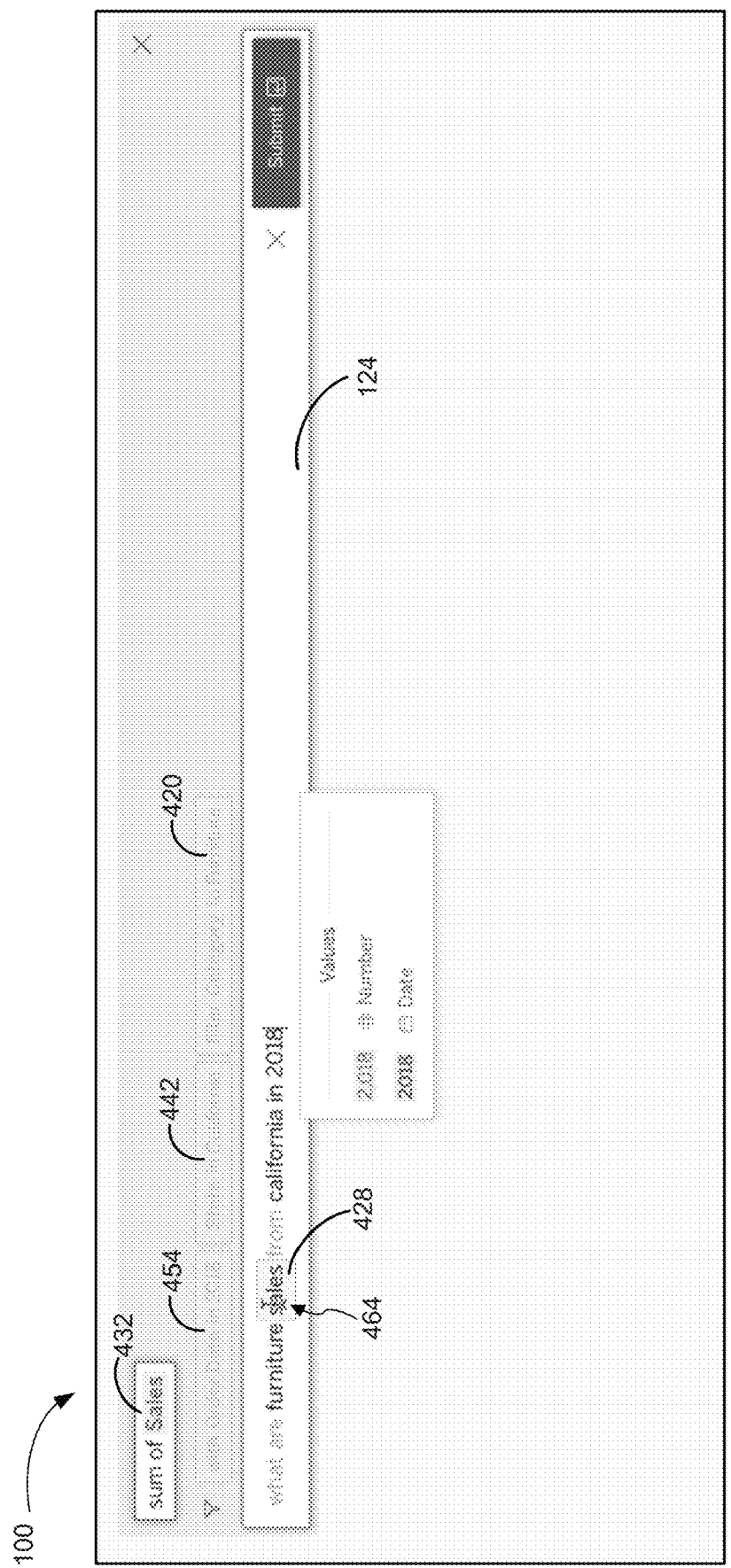
Figure 4L:
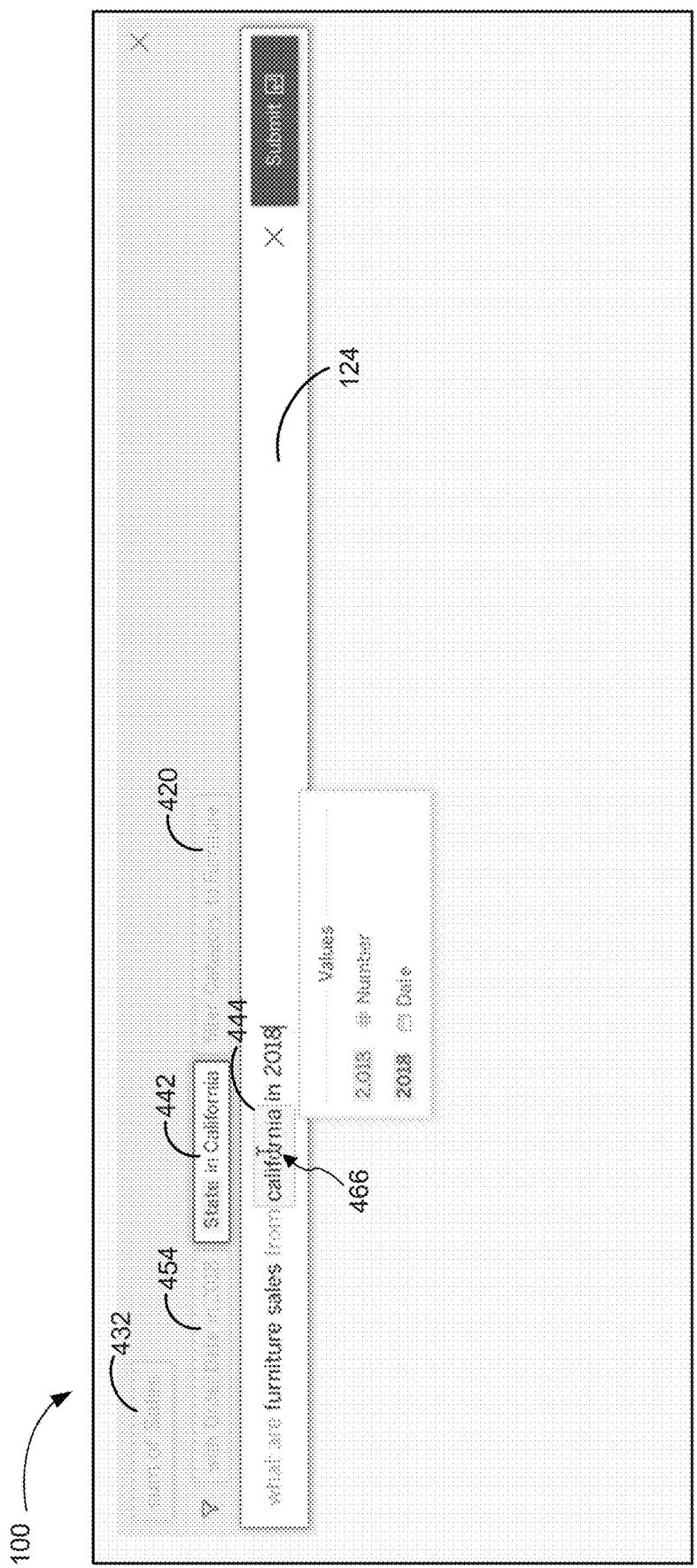
Figure 4M:
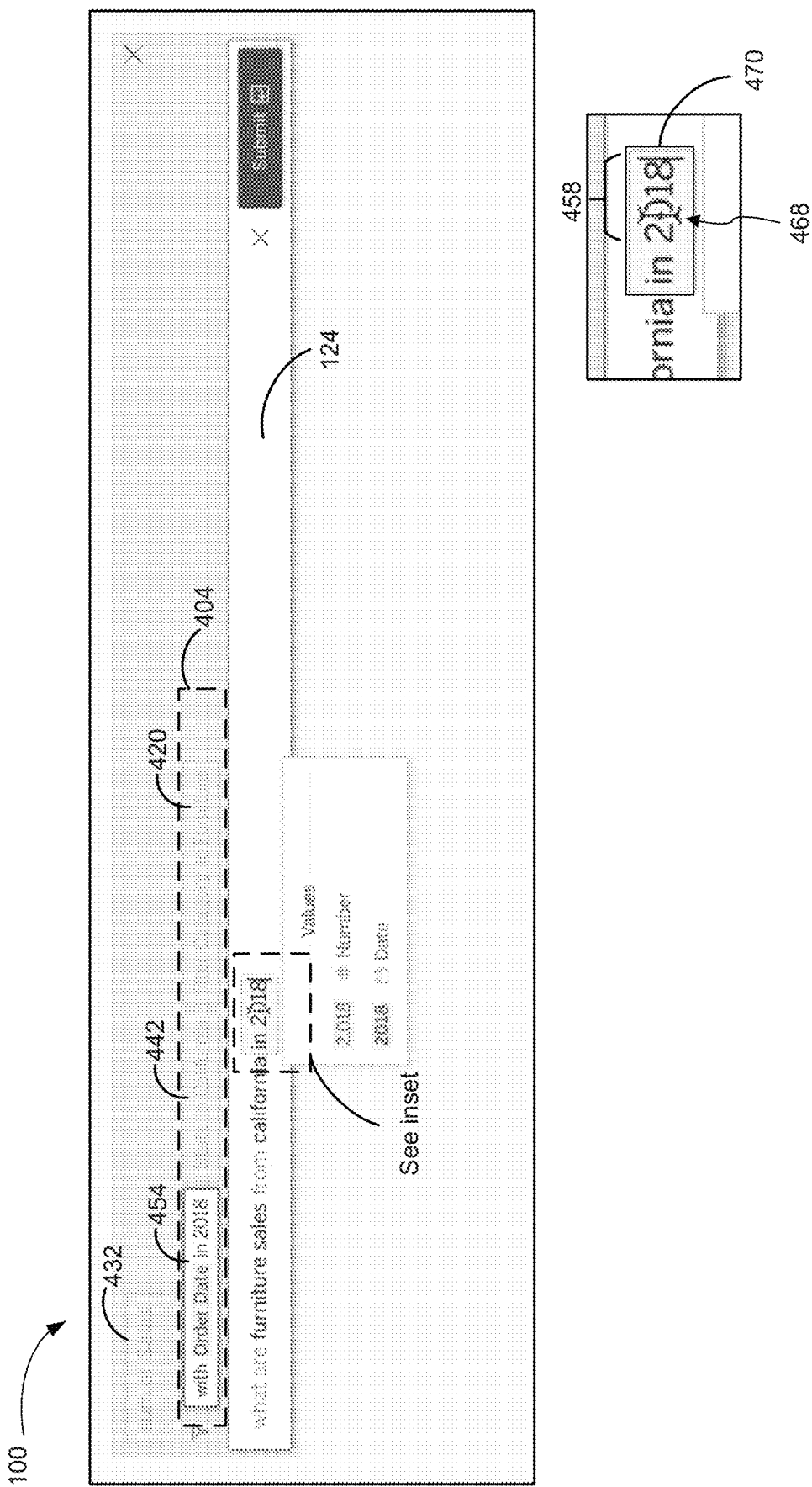
Figure 4N:
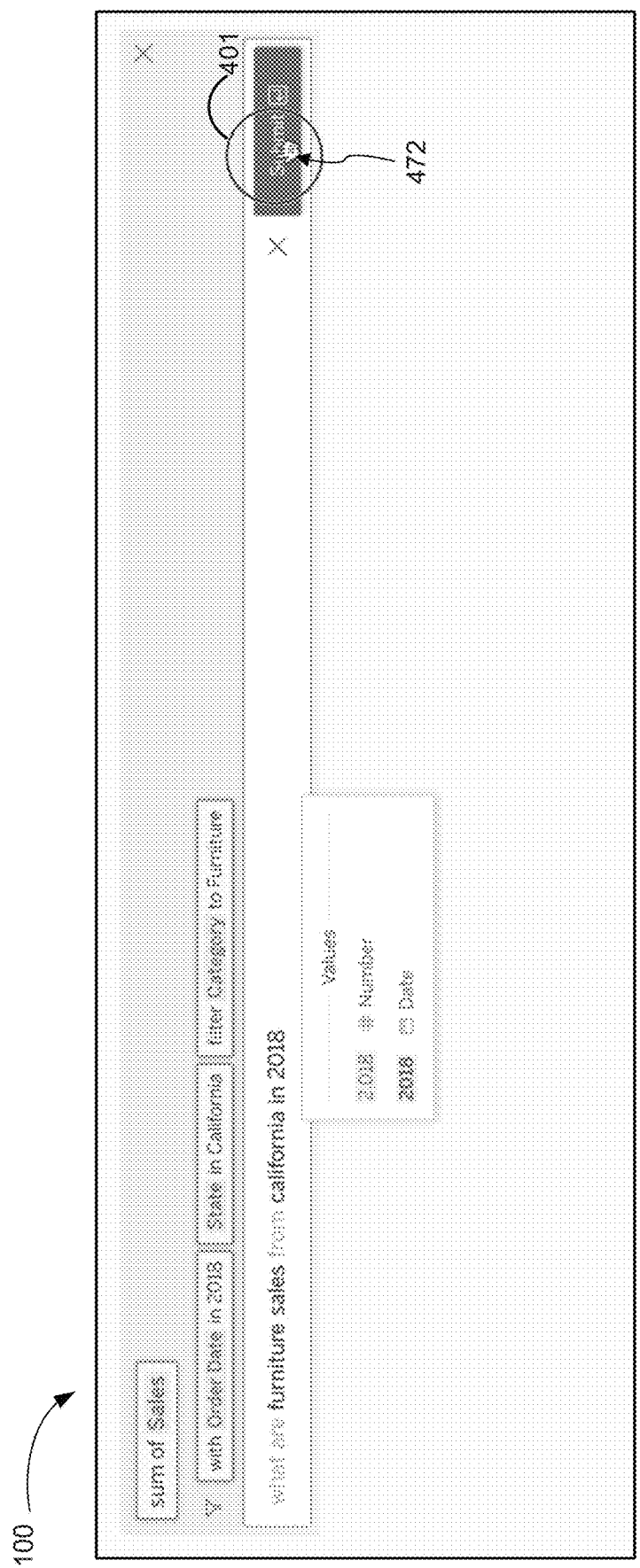
Figure 4O:

FIGS. 4A-4O provide a series of screen shots for interactions with a graphical user interface 100 according to some implementations.

FIG. 4A provides a screen shot for a partial view of a graphical user interface 100 according to some implementations.

In some implementations, as illustrated in FIG. 4A, the graphical user interface 100 comprises a natural language input box 124 for receiving natural language commands from a user. The natural language input box 124 includes a graphical control element 401 (e.g., a "Submit" affordance) that, when selected by a user, causes a natural language command in the input box 124 to be transmitted to the computing system 200 (e.g., the natural language system 236) for analysis and/or interpretation. In some implementations, the computing system 200 generates a visualization (e.g., a data visualization) in response to the analysis and/or interpretation and returns the visualization for display on the graphical user interface 100. In this example, the graphical control element 401 is deactivated (e.g., grayed out) because the graphical user interface 100 has yet to receive a natural language command.

In some implementations, the graphical user interface 100 also comprises a data field interpretation region 402 and a filter interpretation region 404, which are located adjacent to (e.g., above) the natural language input box 124. The data field interpretation region 402 displays how the natural language system 236 interprets the natural language input from a user in light of the selected data source. The filter interpretation region 404 displays the filters (if any) that are applied to data fields of the data source 258 in response to the natural language input from the user. In this example, no interpretation is displayed in the regions 402 and 404 because the graphical user interface 100 has yet to receive a natural language command. In some implementations, the data field interpretation region 402 and the filter interpretation region 404 are collectively referred to as an interpretation region (or the natural language command interpretation region).

FIG. 4B illustrates a user interaction with the graphical user interface 100. In this example, the user inputs (e.g., enters or types) a partial natural language expression 406 (e.g., "what are furni") into the command box 124. In general, the expression can be a command, an input, or an utterance that includes partial or incomplete words (e.g., the partial word "furni"), phrases, and/or sentences. Typically, a natural language expression includes one or more terms that identify entities (e.g., a data field, a data value of a data field, an analytical operation, and/or a data visualization type) from the data source 258. The user may also input the natural language expression by speech, which is then captured using an audio input device 220 (e.g. a microphone) coupled to the computing device 200.

FIG. 4B also illustrates in response to the user interaction, the graphical user interface 100 displays interpretations 410 (e.g., search results, entity search results, or suggestions) in a dropdown menu 408. Each of the interpretations 410 is generated by the natural language system 236 and includes an entity from the data source 258. In the example of FIG. 4B, each of the interpretations 410 identifies a distinct data value 412 in the data source 258 and its corresponding data field 414. For instance, the first interpretation 410-1 identifies a data value 412-1 ("Furnishings") of a data field 414-1 ("Sub-category"). The second interpretation 410-2 identifies a data value 412-2 ("Furniture") of a data field 414-2 ("Category"). In the example of FIG. 4B, each of the data values 412 contains the letters "Furni," corresponding to the keystrokes of the most recently entered term "furni". In this example, the most recently entered term "furni" is a partial word (e.g., an incomplete word). In some implementations, the most recently entered term may be one word (e.g., "sales"), two words separated by a space (e.g., "San Francisco"), three or more words (e.g., "same day shipping"), a phrase, numbers, and/or a combination of letters and numbers.

As also illustrated in FIG. 4B, the letters "Furn" in the interpretations 410 are displayed in a visually distinctive manner (e.g., boldface) from the remaining characters of the data value.

In some implementations, the user may select an interpretation (e.g., one of the interpretations 410) in the dropdown menu 410. In some implementations, user selection of an interpretation corresponding to a term in the partial language command causes the term to be annotated by the natural language system 236. Annotation in this context means that the user has instructed the natural language system 236 to interpret a term (e.g., a word or a phrase) in the input (e.g., natural language utterance, command, and/or question) as a reference to a particular entity in the data source 258 (e.g., as a data field, a data value, and/or an analytical concept). Further details about annotation are described in U.S. patent application Ser. No. 17/026,113, filed Sep. 18, 2020, titled "Using Dynamic Entity Search during Entry of Natural Language Commands for Visual Data Analysis," which is incorporated by reference herein in its entity.

FIG. 4C illustrates another user interaction with the graphical user interface 100. In this example, additional keystrokes 416 (e.g., the letters "ture") are appended to the end of the partial natural language input 406 "what are furni" (e.g., the interpretations 410 in FIG. 4B are not selected). In some implementations, the user may click on any portion of the partial natural language input and input additional keystrokes and/or modify an existing term of the partial natural language input.

In some implementations, the natural language system 236 generates one or more tokens from the character string. A token may include one letter (e.g., a letter of a word, such as the letter "r"), two letters, three or more letters (e.g., letters of a word), one word (e.g., the word "paper"), two or more words, and/or one or more phrases that is formed by combining two or more consecutive words.

Referring again to FIG. 4C, the natural language system 236 concatenates the partial word "furni" and the additional keystrokes 416 to form a token "furniture" (e.g., a word or a term), and interprets the token according to the data source 258 and/or a lexicon 264 for the data source 258. The process of tokenization is also described in U.S. patent application Ser. No. 16/166,125, filed Oct. 21, 2018, titled "Determining Levels of Detail for Data Visualizations Using Natural Language Constructs," which incorporated by reference herein in its entirety. In this example, the natural language processing system 236 recognizes the word (e.g., term or token) "furniture" that has been formed.

FIG. 4C also illustrates that in response to the formation of the token "furniture," the graphical user interface 100 displays updated interpretations in the dropdown menu 408. In this example, only the interpretation 410-2 corresponding to the data value 412-2 ("Furniture") is displayed. The interpretation 410-1 is not displayed because the data value 412-1 "Furnishings" no longer matches the term "Furniture."

Notably, the implementations described in FIGS. 4B and 4C distinguish over the implementation that is described in FIG. 3. In the example of FIG. 3, a user has to input a complete word or phrase (e.g., the phrase 304 "year over year sales") before the graphical user interface 100 displays one or more interpretations 308. On the other hand, FIGS. 4B and 4C illustrate that the interpretations 410 are constantly updated in response to each keystroke entered by the user.

In some implementations, the data visualization application 230 may determine with a high degree of confidence (e.g., with 80%, 85%, 90%, or 95% confidence) that a term in a natural language utterance should be interpreted as a particular entity in the data source. In accordance with the determination, the data visualization application 230 may automatically (i.e., without user invention) annotate the term so that it is interpreted as the particular entity. In some implementations, when a term is automatically annotated by the data visualization system, the data visualization application further determines analytical concepts corresponding to the interpretation. The data visualization application 230 also generates analytical expressions (e.g., phrases) corresponding to the interpretation (e.g., the analytical concepts).

Referring to FIG. 4D, in some implementations, in response to an identification (e.g., recognition) of the token "furniture" by the data visualization application 230, the data visualization application 230 may determine with high confidence that the term "furniture" corresponds to the data value "Furniture" of the data field "Category" in the data source. FIG. 4D illustrates a phrase 420 "filter Category to Furniture" is displayed in the filter interpretation region 404. The phrase 420 is an analytical expression corresponding to the interpretation 410-2. In this example, the natural language processing system 236 suggests a proposed action to add a filter operation that filters rows of the data source to include only those whose "Category" data field have the value "Furniture." FIG. 4D also illustrates display of a default data field 418 (e.g., a phrase "count of Migrated Data (Count)") in the data field interpretation region 402.

In some implementations, the phrases that are displayed in the data field interpretation region 402 and/or in the filter interpretation region 404 are also known as full interpretations or complete interpretations. For example, in FIG. 4D, in response to the partial natural language input "what are furniture", the natural language processing system 236 generates a full interpretation (an ArkLang level of detail expression) consisting of two phrases (e.g., ArkLang analytical expressions) "count of Migrated Data (Count)" and "filter Category to furniture." In some implementations, a phrase may comprise one or more proposed actions on entities of a data source. For example, as described above, the phrase 420 comprises a proposed action to add a filter.

In some implementations, a phrase may be an analytical expression. The analytical expression may include one or more analytical operations. For example, the phrase 418 includes a count operation. The phrase 420 includes a filter operation. In some implementations, the interpretations that are displayed in the dropdown menu 408 (e.g., interpretations 410 in FIGS. 4B, 4C, and 4D) are also known as partial interpretations.

In some implementations, when a term in the partial natural language input is interpreted (e.g., by the natural language processing system 236), the term (in the input command box 124) and its corresponding interpretations (e.g., the phrases in the data field interpretation region 402 and/or in the filter interpretation region 404) are visually emphasized.

In the example of FIG. 4D, the natural language processing system 236 interprets the term 422 (e.g., token) "furniture" in the input command box 124 as a data value 412-2 of the data field 414-2 "Category". Accordingly, the natural language processing system 236 suggests a filter operation that filters rows of the data source to include only those whose "Category" data field have the value "Furniture". When the graphical user interface 100 displays the phrase 420 "filter Category to Furniture" corresponding to the suggested filter operation, the term 422 and the phrase 420 are simultaneously pulsed. The FIG. 4D inset shows a pulse 424 (e.g., a beam, a wave, a shadow) emanating from the term 422 "Furniture." FIG. 4D inset also shows a pulse 426 (e.g., a beam, a wave, a shadow) emanating from the phrase 420 "filter Category to Furniture." In some implementations, the visual emphasis (e.g., pulsing) occurs in real time as the user inputs the natural language command. The visual emphasis (e.g., pulsing) draws attention to the user that a term in the natural language command has been interpreted a certain way. The user can also decide whether the interpretation by the data visualization application 230 is accurate (e.g., consistent with what the user has in mind) or if the interpretation requires further modification.

In some implementations, the term that has been automatically annotated and interpreted, as well as its corresponding phrases, may also be visually emphasized in some other manner in addition to (or as an alternative to) pulsing. For example, the term may be displayed in a manner (e.g., boldface, italicized, using a different font type, using a different font size, using a different font color, changing the size of the font as it is emphasized, highlighting, or adding a frame around the term) that is visually distinctive from other terms in the input command box 124. The phrases corresponding to the term may be displayed in a manner (e.g., boldface, italicized, using a different font type, using a different font size, using a different font color, changing the size of the font as it is emphasized, highlighting, or adding a frame around the phrase) that are visually distinctive from other phrases in the data field interpretation region 402 and/or the filter interpretation region 404, which do not map to the interpreted term.

In some implementations, the data visualization application 230 visually de-emphasizes one of more terms (e.g., tokens) in the partial natural language command that have not been mapped to a phrase. For example, in FIG. 4D, the terms "what are" in the natural language expression are visually de-emphasized (e.g., grayed out) because they are not related to the default count 418 or the default filter 420. Stated another way, visually de-emphasized terms do not map to a phrase (an analytical expression) in the interpretation region. In some implementations, the presence of a visually de-emphasized term informs the user that the natural language processing system 236 does not use the term when generating interpretations for the natural language command. Accordingly, in this example, instead of the natural language command "what are furniture," a user can simply input "furniture" to obtain the interpretation 410-2, the phrase 418, and the phrase 420.

In some implementations, when one or more terms in the partial natural language command include one or more terms that are recognized by the natural language system 236 (e.g., after the graphical user interface 100 displays interpretations such as the interpretations 410-2, the default count 418 and/or the default filter 420), the graphical control element 401 becomes activated. A user may at this point select the graphical control element 401 to cause the partial natural language command in the input box 124 to be transmitted to the data visualization application 230 for analysis (e.g., using the full interpretation as defined by the default count 418 and/or the default filter 420). Alternatively, the user may continue to modify the partial language command, such as input additional keystrokes, modify or delete existing terms, and/or select an alternative interpretation.

FIG. 4E illustrates a user interaction with the graphical user interface 100. In this example, the user inputs an additional term 428 ("sales") after the partial natural language input "what are furniture". In response to the user interaction, the dropdown menu displays one interpretation 430 "Sales," which is a measure. In this example, the data visualization application 230 automatically annotates the term 428 "Sales," which instructs the data visualization application 230 to interpret the term 428 as the measure "Sales" in the data source.

As also illustrated in FIG. 4E, in response to the annotation, the graphical user interface 100 replaces the default count 418 in the data field interpretation region 402 with an updated data field interpretation 432 (e.g., a phrase) "sum of Sales", corresponding to an aggregation of the measure "Sales" (the interpretation 430). In some implementations, when the graphical user interface 100 displays the phrase 432, the data visualization application 230 also simultaneously visually emphasizes the phrase 432 and its corresponding term 428 (e.g., using the various implementations that are discussed in FIG. 4D).

Referring again to FIG. 4E, in some implementations, when a user inputs a query (e.g., "what are furniture sales"), the data visualization application 230 (e.g., the natural language system 236) interprets the query (or more specifically, interprets the non-grayed out terms "furniture sales"). In some implementations, the data visualization application 230 maps the terms to one or more concepts in a lexicon (e.g., the grammar lexicon 262 and/or the data source lexicon 264). The natural language system 236 determines a respective interpretation for the each of the tokens (e.g., the tokens "furniture" and "sales"). In this example, the token furniture is interpreted as a data value of the data field "Category." The token "sales" is interpreted as a data field. The natural language system 236 also generates a full interpretation that comprises a combination of the respective interpretations. In FIG. 4E, the full interpretation is represented by the phrase 432 "sum of Sales" and the phrase 420 "filter Category to Furniture." The phrase 420 is a proposed action to filter data rows of the data source to include only those whose "Category" data field have the value "Furniture." The phrase 432 is a proposed action to aggregate data for the data field "Sales."

In some implementations, as illustrated in FIGS. 4D and 4E, the position of the dropdown menu 408 changes based on the position of a most recently entered term (e.g., word or keystrokes) in the natural language input box 124. In FIG. 4D, the dropdown menu 408 is located immediately below the term "furniture." In FIG. 4E, the dropdown menu 408 is displaced further to the right compared to that in FIG. 4D, and is located immediately below the most recently entered term "sales". Stated another way, the dropdown menu 408 is located immediately below the substring of the input text that corresponds to the displayed search results (e.g., the input text "furniture" in FIG. 4D and the input text "sales" in FIG. 4E).

FIG. 4F illustrates a user interaction with the graphical user interface 100. In this example, the user inputs additional terms 434 "from California" to the partial natural language command "what are furniture sales". FIG. 4F also illustrates in response to the user input of the most recently entered term "California," the dropdown menu 408 displays an interpretation 436, which suggests that the term "California" corresponds to a data value 438 "California" in the data field 440 "State."

In some implementations, the natural language processing system 236 maps the term "California" to concepts in a lexicon (e.g., the grammar lexicon 262 and/or the data source lexicon 264). The natural language processing system 236 determines with high confidence that the term "California" is a value of the data filed "State" and automatically annotates the term so that it is interpreted as such. In some implementations, and illustrated in FIG. 4G, in response to the determination (and automatic annotation), the graphical user interface 100 displays a second phrase 442 ("with State in California") corresponding to the interpretation 436. In this example, the phrase 442 includes a proposed action to filter values of "State" to the value "California."

In some implementations, when the phrase 442 is displayed, the phrase 442 and its corresponding term (in the user input box 124) are visually emphasized. As illustrated in the FIG. 4G inset, the term "California" in the user input box 124 is visually emphasized by including a frame 444 around the term "California" and pulsing the term. The shadow 448 surrounding the frame 444 (surrounding the term "California") illustrates the pulsing effect on the term. In some implementations, the pulsing effect comprises a pulse that originates from the center of the frame 444 (the center of the term "California") and travels toward the two ends of the frame 444. In some implementations, the pulsing effect comprises a pulse that originates from one end of the frame 444 and travels along the length of the frame 444 to the other end.

The FIG. 4G inset also illustrates visual emphasis of the phrase 442. In this example, the visual emphasis of the phrase 442 comprises a pulsing effect, as illustrated by the shadow 446 surrounding the phrase 442. In some implementations, the graphical user interface 100 visually emphasizes both the term and its corresponding phrase simultaneously. In some implementations, visual emphasis of the term and its corresponding phrase occur sequentially. For example, the graphical user interface 100 may first display the phrase in a visually emphasized manner, and then proceed to display the term corresponding to the phrase in a visually emphasized manner. Alternatively, the graphical user interface 100 may first display the term in a visually emphasized manner, and then proceed to display the corresponding phrase in a visually emphasized manner. In some implementations, visually emphasizing the term and the corresponding phrase includes applying the same visual effect to both the term and the phrase. For example, both the term and the phrase are pulsed. In some implementations, the term and the corresponding phrase may be visually emphasized using different visual effects. For example, the term in the input command box 124 may be highlighted while its corresponding phrase may be simultaneously pulsed.

FIG. 4G also illustrates that the term "from" in the natural language input query is visually de-emphasized (e.g., grayed out). This suggests that the term "from" is not mapped to any of the phrases 432 ("sum of Sales"), 442 ("with State in California"), or 420 ("filter Category to Furniture").

FIG. 4H illustrates another user interaction with the graphical user interface 100. In this example, the user appends additional terms 450 ("in 2018") to the partial natural input query (e.g., "what are furniture sales from California"). FIG. 4H also illustrates the dropdown menu 408 displaying interpretations 452 in response to a most recently entered term (the term "2018") of the additional terms 450 ("in 2018"). In this example, the interpretations 452 include a first interpretation 452-1 corresponding to the number 2,018 (a numerical value). The interpretations 452 also include a second interpretation 452-2 corresponding to the date value "2018".

FIG. 4I illustrates the display of a phrase 454 ("with Order Date in 2018") in response to a determination (and automatic annotation) that the most recently entered term "2018" corresponds to a date data value (the second interpretation 452-2). The inset of FIG. 4I also shows the phrase 454 and the term 458 ("2018") corresponding to the phrase 454 are simultaneously visually emphasized (e.g., with a pulsing effect). In this example, the pulsing effects on the phrase 454 and the term 458 corresponding to the phrase 454 are illustrated by a shadow 456 surrounding the phrase 454 and by a shadow 460 surrounding the term 458.

In some implementations, a phrase includes a term and an analytical concept for the term. For example, in FIG. 4I, the phrase 454 "with Order Date in 2018" is a filter expression 244 that includes the term "2018" and includes a concept to filter values of the Order Date field to the year 2018. As discussed earlier with respect to FIG. 2B, in some implementations, the filter expressions 244 have the canonical form [att filter val], where att is an attribute, filter∈Filters, and val∈Values. In some implementations, when a natural language input appears underspecified, the natural language system 236 assigns one or more default fields to the underspecified input to generate a phrase. In this example, the natural language system 236 maps "in 2018" to "filter val" and selects the data field "Order Date" as the default attribute.

In some implementations, when a user interacts with (e.g., hovers over and/or clicks on) a term in the natural language input box 124, the graphical user interface 100 maintains display of the phrases corresponding to the term while visually de-emphasizing other phrases that do not correspond to the term. FIGS. 4J, 4K, 4L, and 4M illustrate this behavior.

FIG. 4J shows a user hovering over (462) (and/or clicking on) the term 422 ("furniture") in the natural language input box 124. In response to the user interaction, display of the phrase 420 (e.g., "filter Category to Furniture") corresponding to the term 422 "furniture" is maintained. Other phrases (the phrase 432 "sum of sales," the phrase 454 "with Order Date in 2018," and the phrase 442 "State in California") in the interpretation region that do not correspond to (e.g., not mapped to or not related to) the term 422 are visually de-emphasized (e.g., grayed out or faded).

In FIG. 4K, in response to a user hovering (464) over the term 428 "sales" in the natural language input box 124, display of the phrase 432 "sum of sales" corresponding to the term 428 "sales" is maintained. Other phrases (the phrase 454 "with Order Date in 2018," the phrase 442 "State in California," and the phrase 420 "filter Category to Furniture") in the interpretation region that are not related to (e.g., not mapped to) the term 420 are visually de-emphasized.

FIGS. 4L and 4M illustrate effects that are similar to those described in FIGS. 4J and 4K. For example, FIG. 4L illustrates in response to a user hovering (466) over the term 444 "California," display of the phrase 442 corresponding to the term "California" is maintained whereas the phrases 432, 454, and 420 not related to the term "California" are visually de-emphasized.

In some implementations, and as illustrated in FIG. 4M and the inset, in response to user hovering (468) over a term 458 ("2018"), the graphical user interface 100 displays a frame 470 around the terms "in 2018." That is to say, the data visualization application 230 groups the term 458 "2018" and the adjacent term "in" because these two terms collectively map to the phrase 454 "with Order Date in 2018." The graphical user interface 100 also maintains display of the phrase 454 "with Order Date in 2018" while visually de-emphasizing the phrases 432, 442, and 420.

FIGS. 4J to 4M illustrate how a user can interact with (e.g., hover over) a term (a token) in a natural language command and visually correlate the term and the phrases to which the term has been mapped. Any unexpected or incorrect mapping between a term and the phrases will be immediately visible to the user, thus enabling prompt correction (e.g., the user can delete an erroneous phrase and/or modify the natural language input).

FIGS. 4J to 4M also illustrate the phrases in the interpretation region may be ordered differently from the order of the terms in the natural language command. For example, the phrase 454 "with Order Date in 2018" appears as the first phrase in the filter interpretation region 404 whereas the terms "in 2018" that are mapped to the phrase are the last two terms in the natural language command.

FIG. 4N illustrates user selection (472) of the graphical control element 401. As discussed earlier, user selection of the graphical control element causes the natural language command (e.g., "what are furniture sales from California in 2018") to be transmitted to the data visualization application 230. In this example, the data visualization application 230 has already interpreted the terms "furniture," "sales," "California," and "in 2018" as respective particular entities in the data source 258. The data visualization application 230 has also generated analytical expressions (phrases) 432, 454, 442, and 420 corresponding to the interpretation. The data visualization application 230 will use the assigned meanings for these terms and does not have to identify other meanings for these terms as it is synthesizing a viable meaning for the entire phrase.

In some implementations, after determining an interpretation for a term (e.g., a token), the computing device 200 assigns an index to the term (e.g., the phrase to which it applies) and stores the term, the interpretation, and/or one or more analytical expressions (phrases) corresponding to the interpretation. FIG. 4O illustrates a representative table (data structure) 480 for the natural language query "what are furniture sales from California in 2018" that may be stored by the computing device 200. In this example, the table 480 only includes terms that are understood (have been interpreted) by the data visualization application. The "Term (Token) Number" heading refers to the order of the term in the natural language query. For example, the term "furniture" is the third word in the query and therefore its term (token) number is 3. The index identifies a phrase. In this example, both "in" and "2018" apply to the same phrase, so they both have the same index value 4. Some implementations also store a position number within each phrase (e.g., "in" is at position 3 in the phrase "with Order Date in 2018", whereas "2018" is at position 4; because "Order Date" is one field name, it counts as just one position).

FIGS. 5A-5K provide a series of screen shots for interactions with a graphical user interface 100 according to some implementations.

Figure 5A:
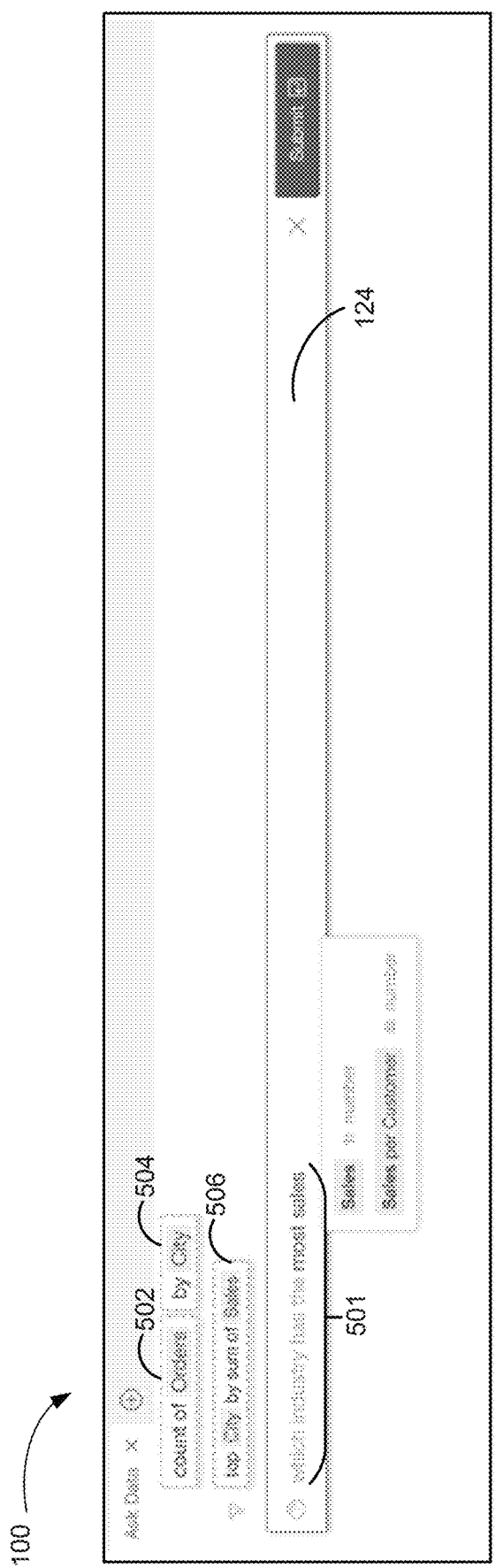
FIGS. 5A-5K provide a series of screen shots for interactions with a graphical user interface according to some implementations.

FIG. 5A illustrates a user interaction with the graphical user interface 100. In this example, the user inputs a natural language command 501 (e.g., "which industry has the most sales"). In response to the natural language command 501, the graphical user interface 100 displays analytical expressions (phrases) 502 ("Count of Orders"), 504 ("by City"), and 506 ("top City by Sum of Sales").

FIG. 5A also illustrates that the natural language command 501 includes terms (e.g., "which industry has the") that are visually de-emphasized (grayed out). As described earlier with reference to FIG. 4, visually de-emphasized terms in a natural language command do not map to a phrase (an analytical expression) in the interpretation region. Accordingly, the data visualization application 230 is interpreting just the terms "most sales" in the natural language command 501 and the phrases 502, 504, and 506 are phrases corresponding to the terms "most sales." The visually de-emphasized terms informs the user that the query is not being interpreted the way it is supposed to be because the word "industry" has not been recognized.

Figure 5B:
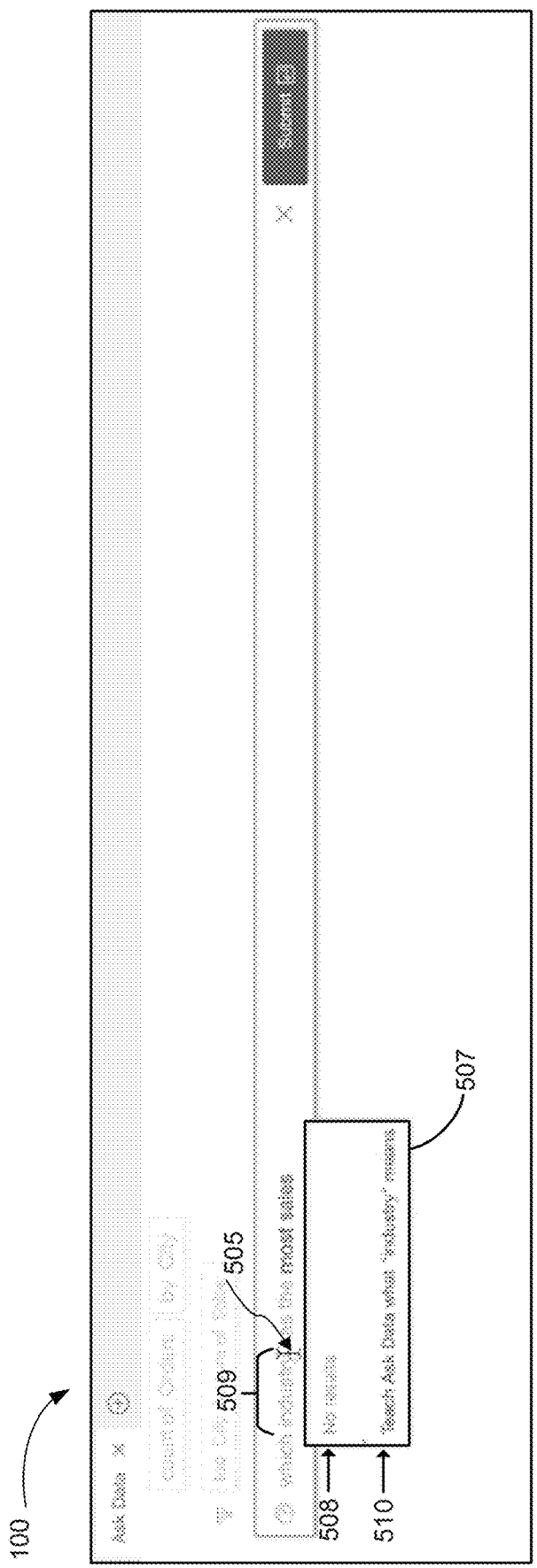

FIG. 5B illustrates another user interaction with the graphical user interface 100. In this example, the user selects (505) a visually de-emphasized term 509 "industry." In response to the user selection, the graphical user interface 100 displays a dropdown menu 507 that includes an indication 508 that there is no entity corresponding to term 509 (e.g., "No results"). The dropdown menu 507 also displays a prompt 510 (e.g., "Teach Ask Data what 'industry' means") requesting the user to teach (e.g., train) the data visualization application 230 to interpret terms that are unknown to the data visualization application 230.

Figure 5C:
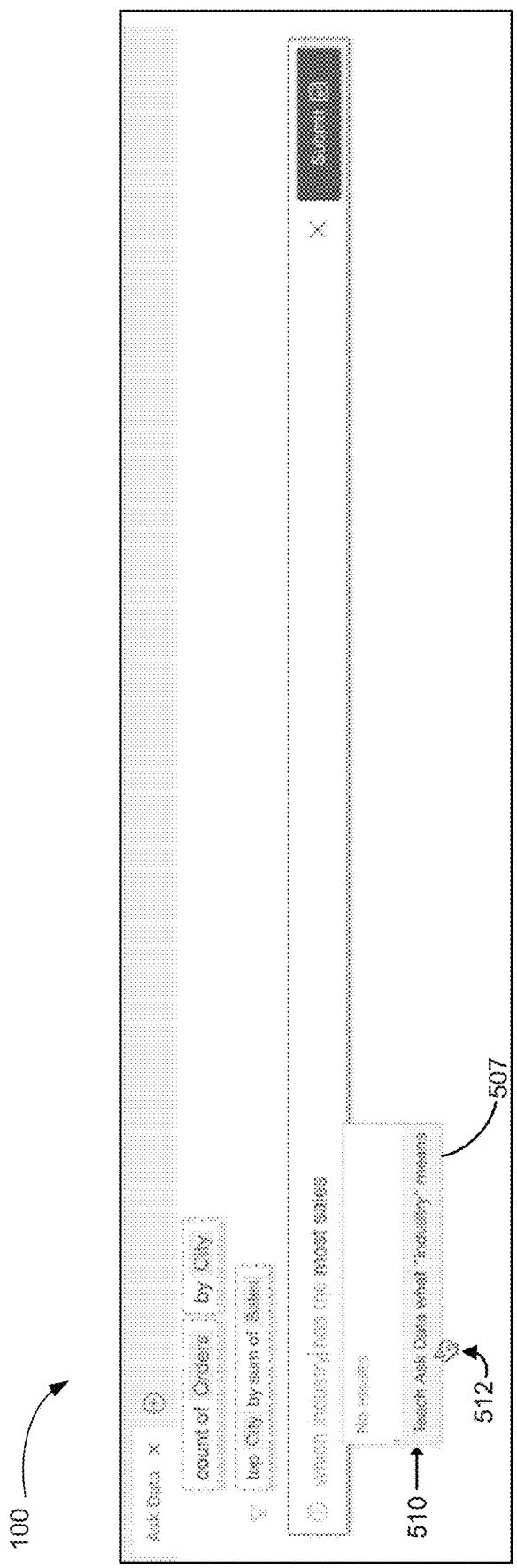

FIG. 5C illustrates user selection (512) of the prompt 510.

Figure 5D:
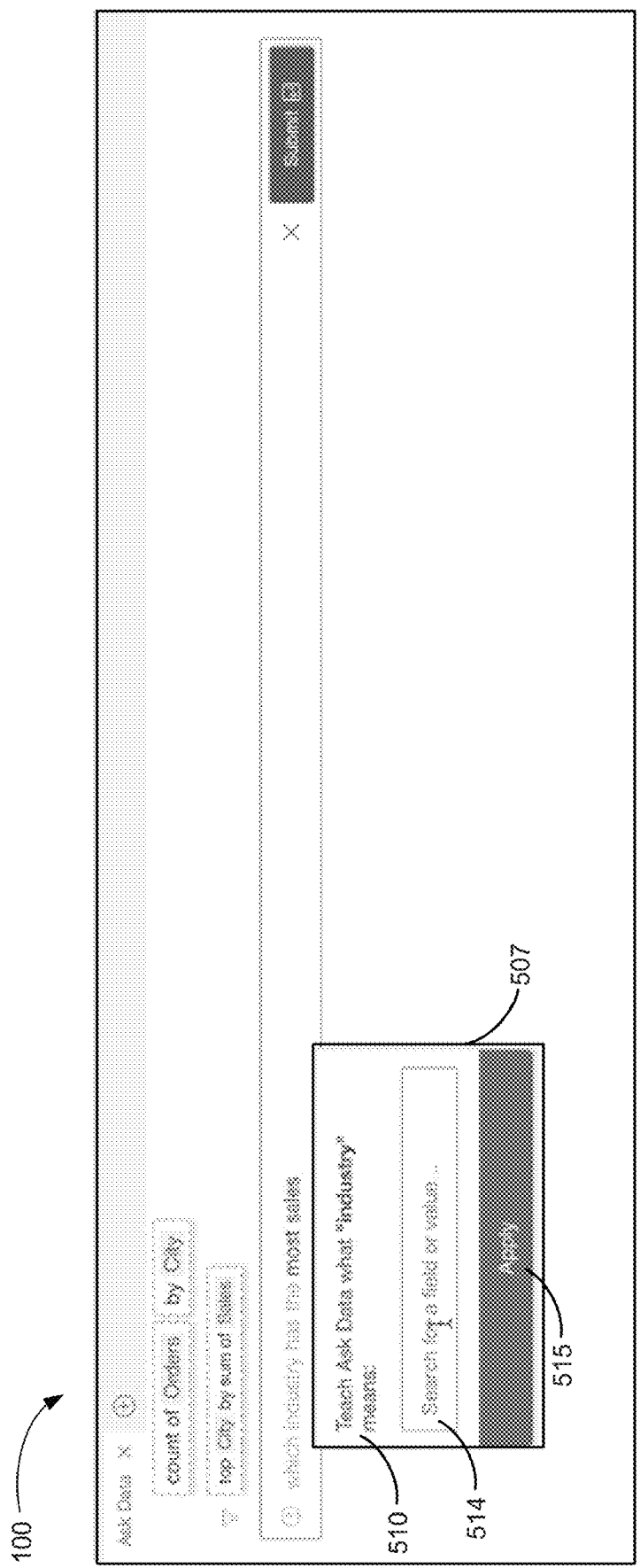

FIG. 5D illustrates in response to the user selection, the dropdown menu 507 displays an input box 514, and a button 515 to save the user input.

Figure 5E:
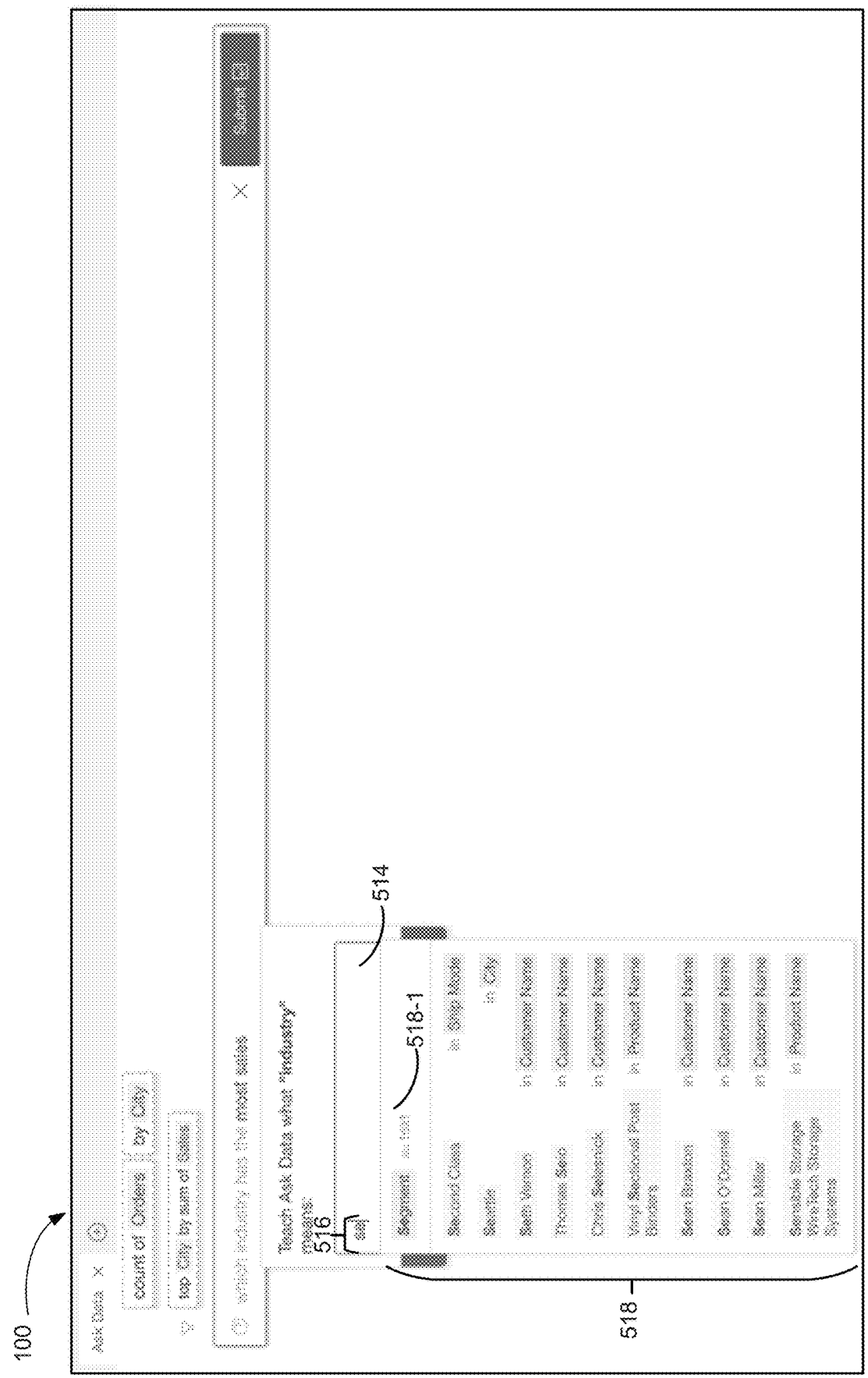

FIG. 5E illustrates user interaction with the input box 514. In this example, the user inputs keystrokes 516 (e.g., the keystrokes "se") into the input box 514. In response to the user interaction, the graphical user interface 100 displays suggested interpretations 518 (e.g., entities in the data source). Each of the suggested interpretations includes the letters "se" of the keystrokes 516.

Figure 5F:
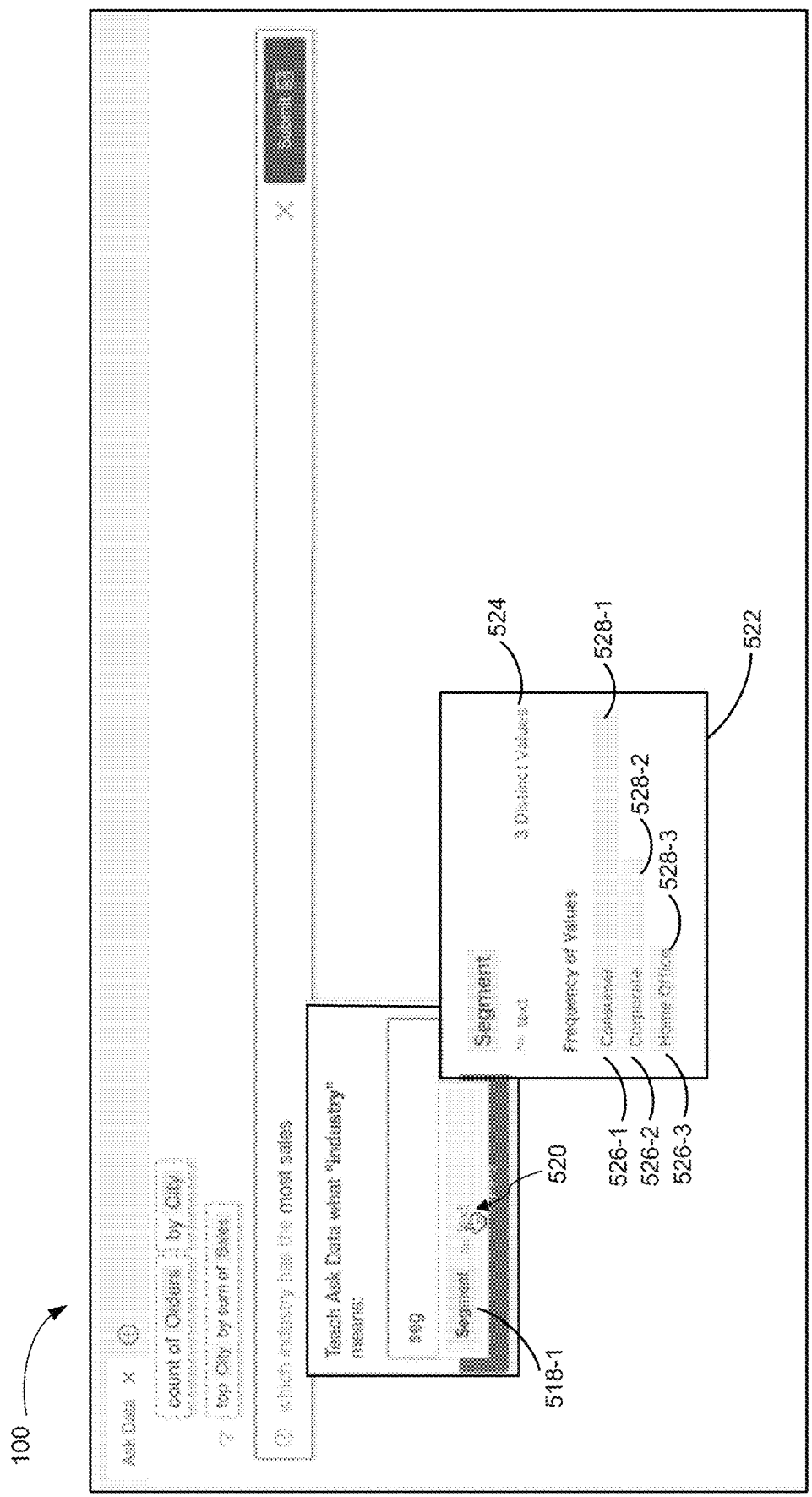

FIG. 5F illustrates a user interaction (520) (e.g., hovering over) with a first suggested interpretation 518-1 (the data field "Segment"). In response to the user interaction, the graphical user interface 100 also displays a window 522 that contains details about the data field "Segment," including the number of distinct data values of the data field 524, the data values 526 of the data field "Segment," and a respective frequency 528 of each of the data values 526.

Figure 5G:
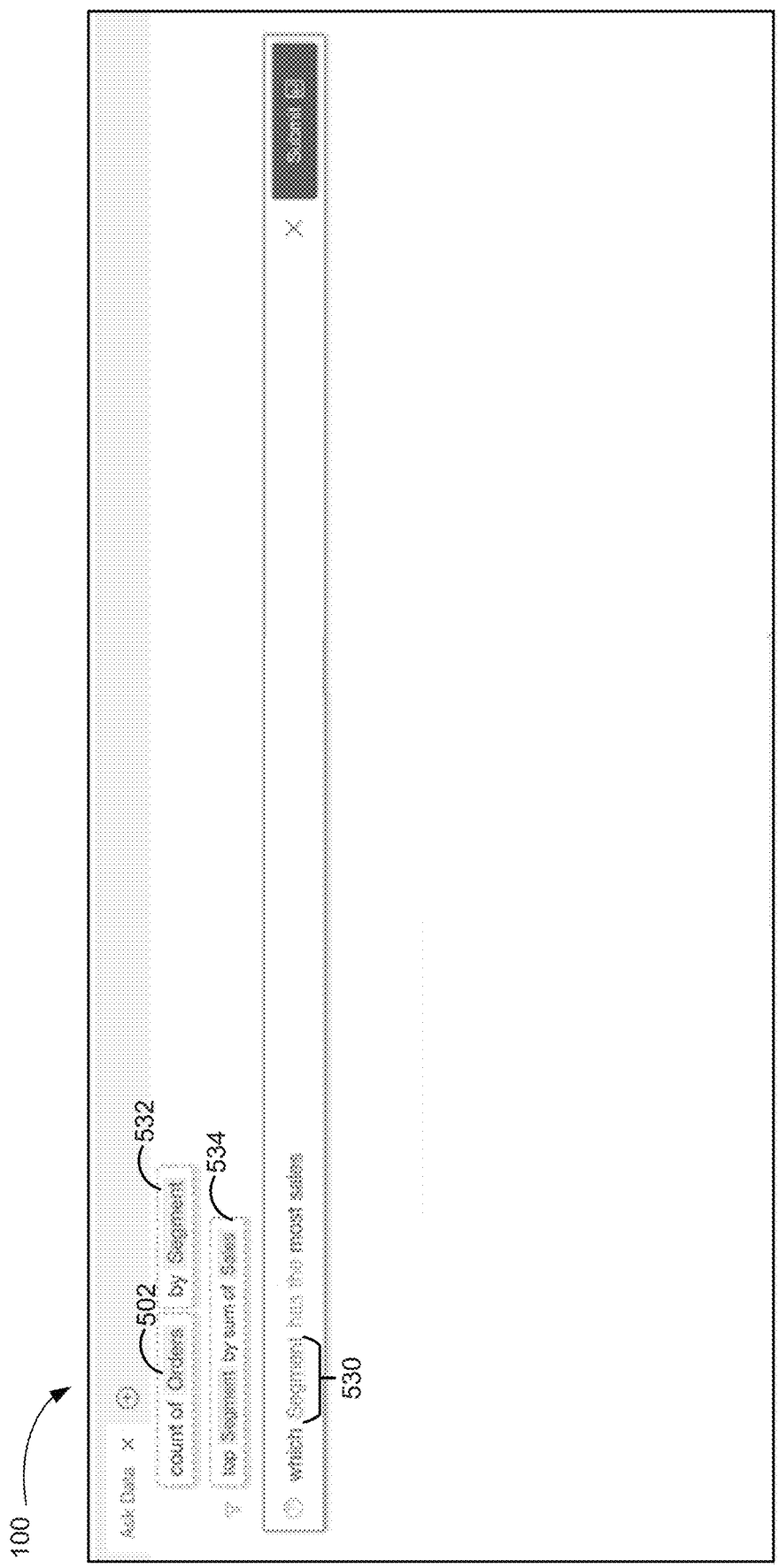

FIG. 5G illustrates in response to user selection of the first suggested interpretation 518-1 (e.g., in response to user selection of the "Apply" 515 affordance), the data visualization application 230 replaces the term 509 "industry" that was in the natural language command 501 with the user specified term 530 "Segment." FIG. 5G also illustrates that the interpretation region displays updated phrases in response to the user selection. In this example, the phrase 504 "by City" and the phrase 506 "top City by Sum of Sales" are replaced with a first updated phrase 532 "by Segment" and a second updated phrase 534 "top Segment by Sum of Sales."

In some implementations, user selection of a suggested interpretation causes the data visualization application 230 to store the selected entity as a synonym of the unknown term. For example, in FIG. 5G, user selection of the interpretation 518-1 "Segment" causes the data visualization application 230 to store the data field "Segment" as a synonym of the previously unknown term "industry."

Figure 5H:
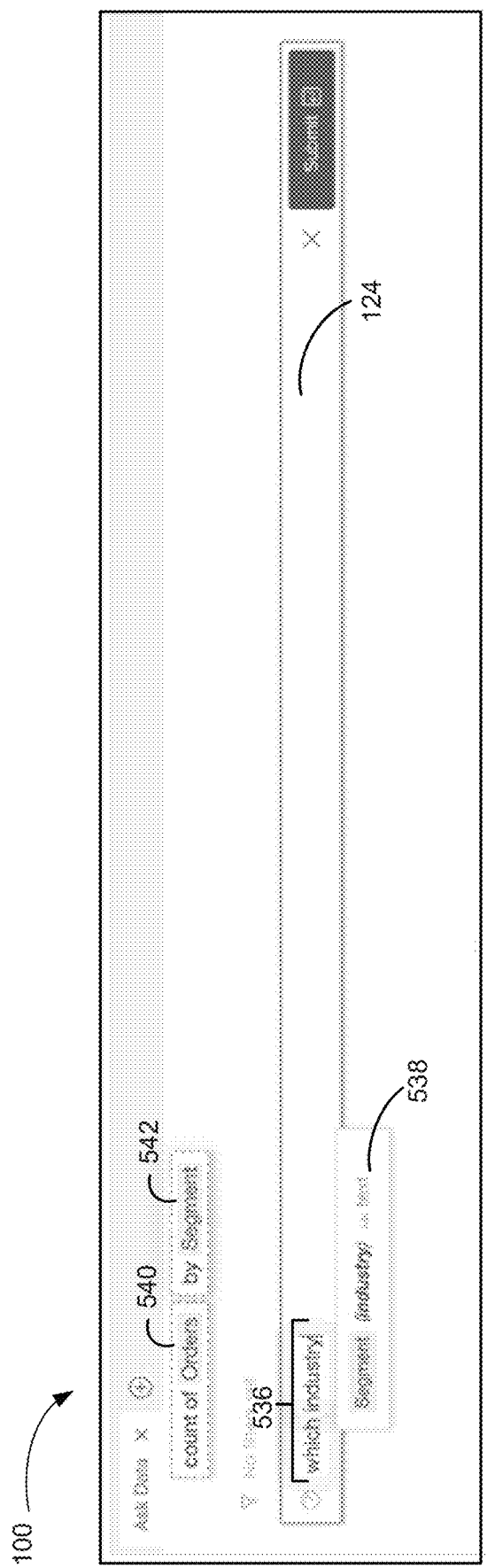

FIG. 5H illustrates a subsequent user interaction with the graphical user interface 100. In this example, the user enters in the input box 124 a new query 536 (a natural language command), which includes the terms "which industry." In response to the query 536 (e.g., to the most recently entered term "industry"), the graphical user interface 100 displays an interpretation 538 ("Segment"), which corresponds to the data field "Segment" that the user had previously defined in FIGS. 5F and 5G. The graphical user interface 100 also displays an interpretation for the query 536, which is defined by a first phrase 540 ("count of Orders") and a second phrase 542 ("by Segment").

Figure 5I:
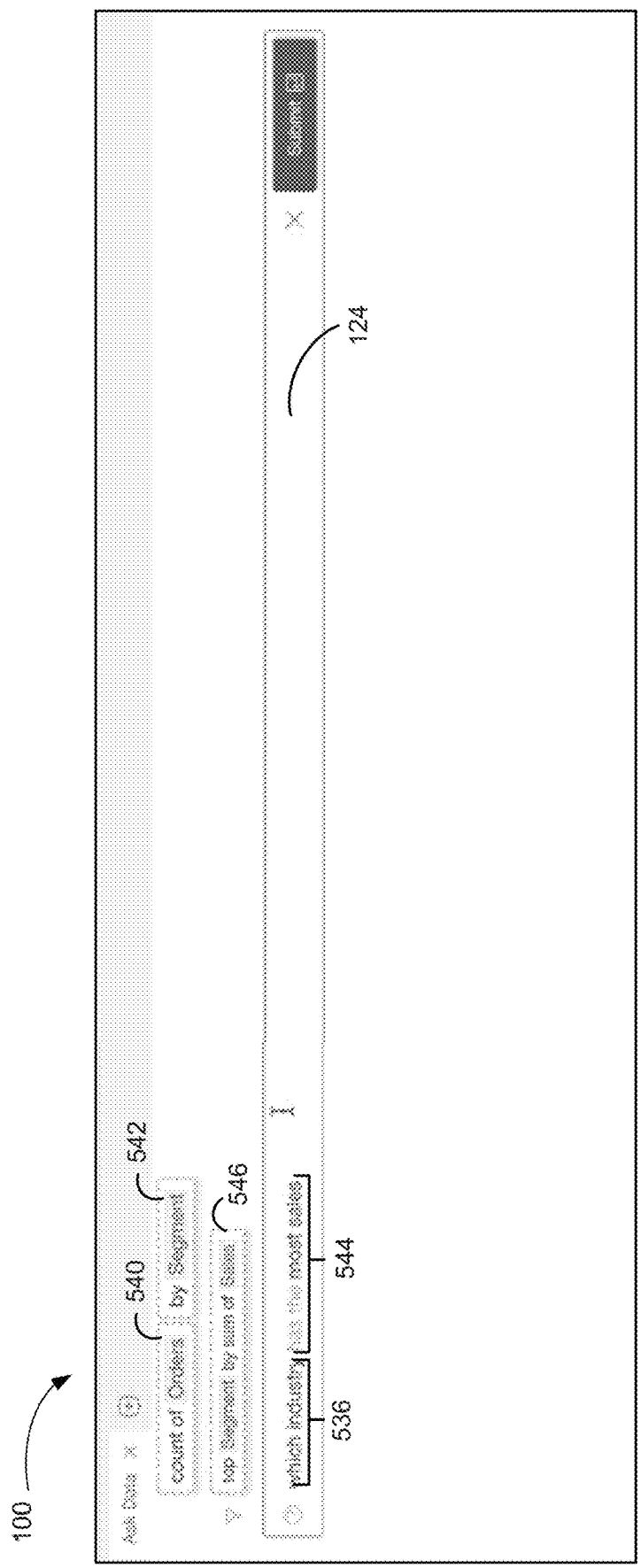

FIG. 5I illustrates continued user interaction with the graphical user interface 100. In this example, the user appends additional terms 544 ("has the most sales") to the query 536. Of the additional terms 544, the terms "has the" are grayed out, which suggests that they are not recognized (or understood) by the natural language processing system 236 and do not contribute to the system's interpretation of the natural input query. On the other hand, the terms "most sales" of the additional terms 544 are not grayed out. This suggests that the natural language processing system 236 understands (recognizes) the terms "most sales" and generates interpretations for the terms. FIG. 5I also illustrates display of an additional phrase 546 (e.g., "top Segment by sum of Sales") in response to an interpretation of the terms "most sales" by the data visualization application 230.

Figure 5J:
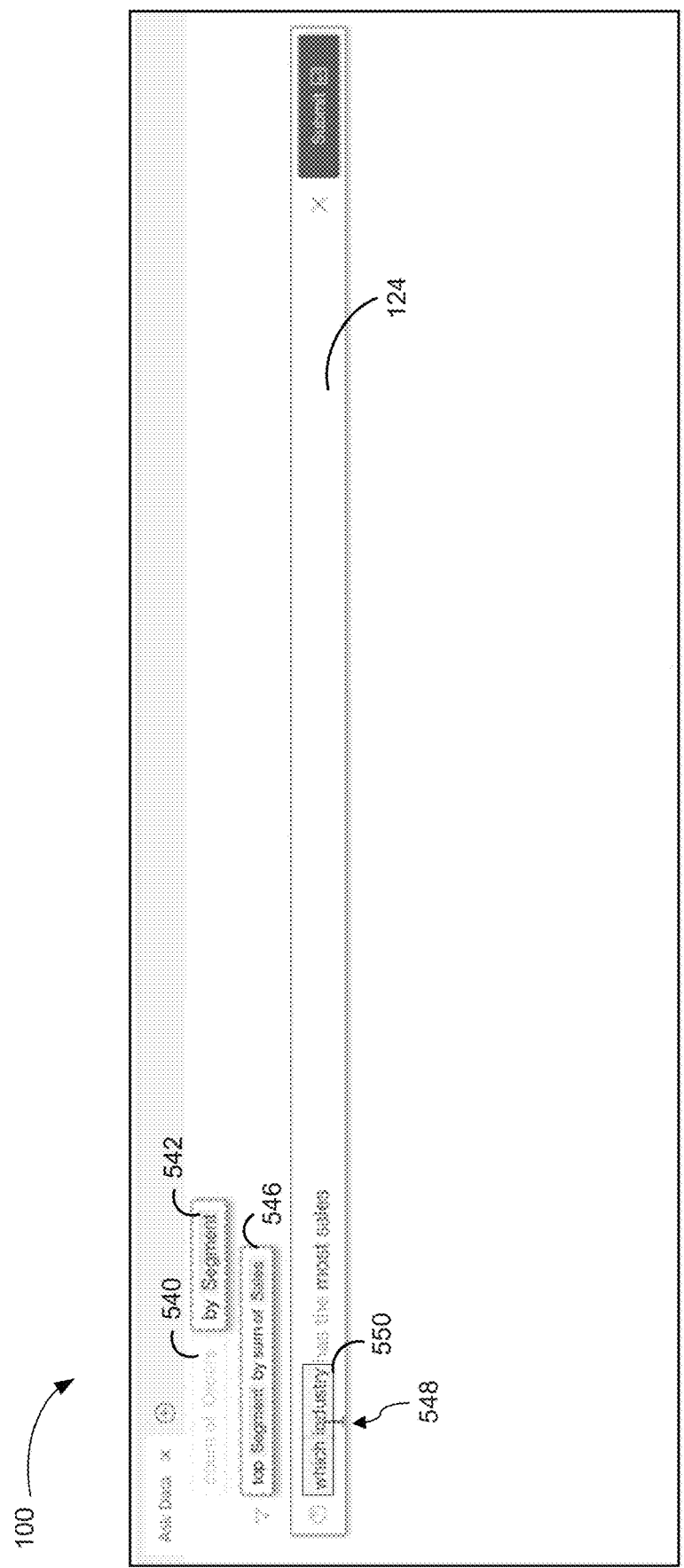

FIG. 5J illustrates a user interaction with the natural language command. In this example, the user hovers (548) over the term "industry." In response to the hovering over, the graphical user interface 100 displays a frame 550 around the terms "which industry." The graphical user interface 100 also maintains display of the phrase 542 "by segment" and the phrase 546 "top Segment by sum of Sales." The graphical user interface 100 also visually de-emphasizes the phrase 540 "count of Orders." This suggests that the terms "which industry" in the natural language command collectively map to (e.g., correspond to) the phrases 546 and 542 and are not related to the phrase 540.

Figure 5K:
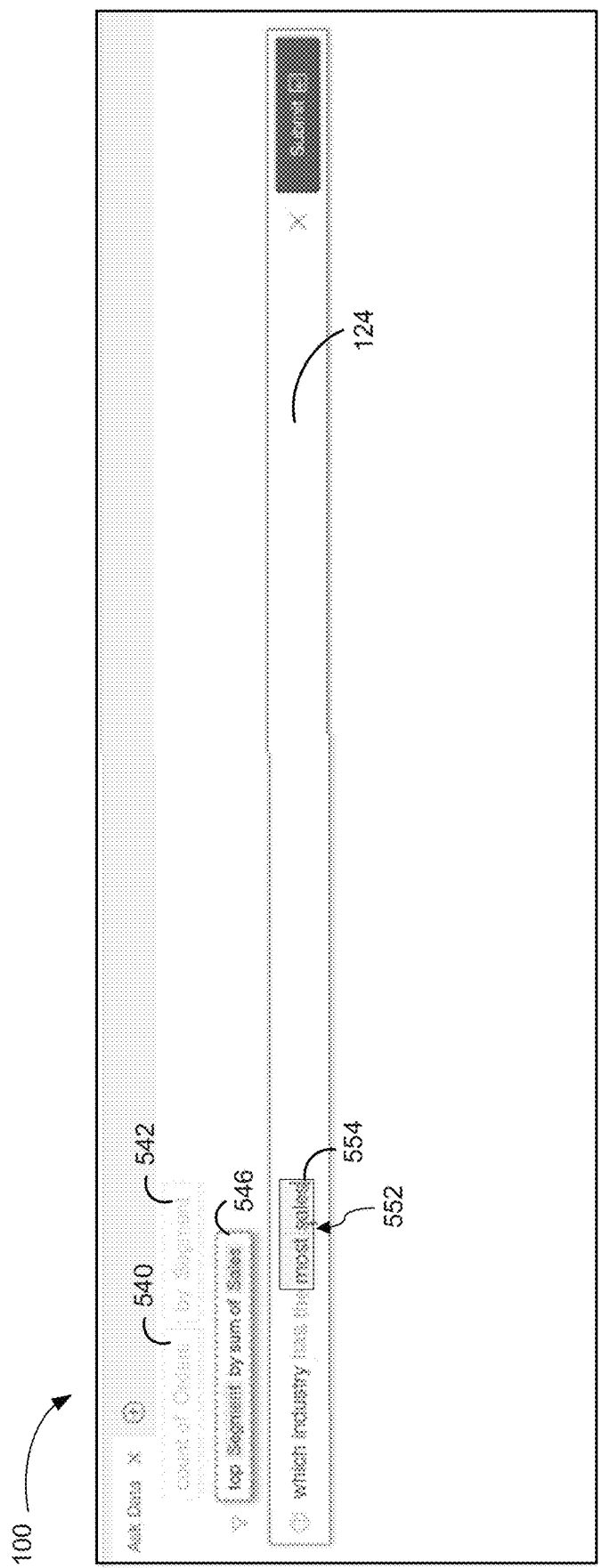
Figure 6A:
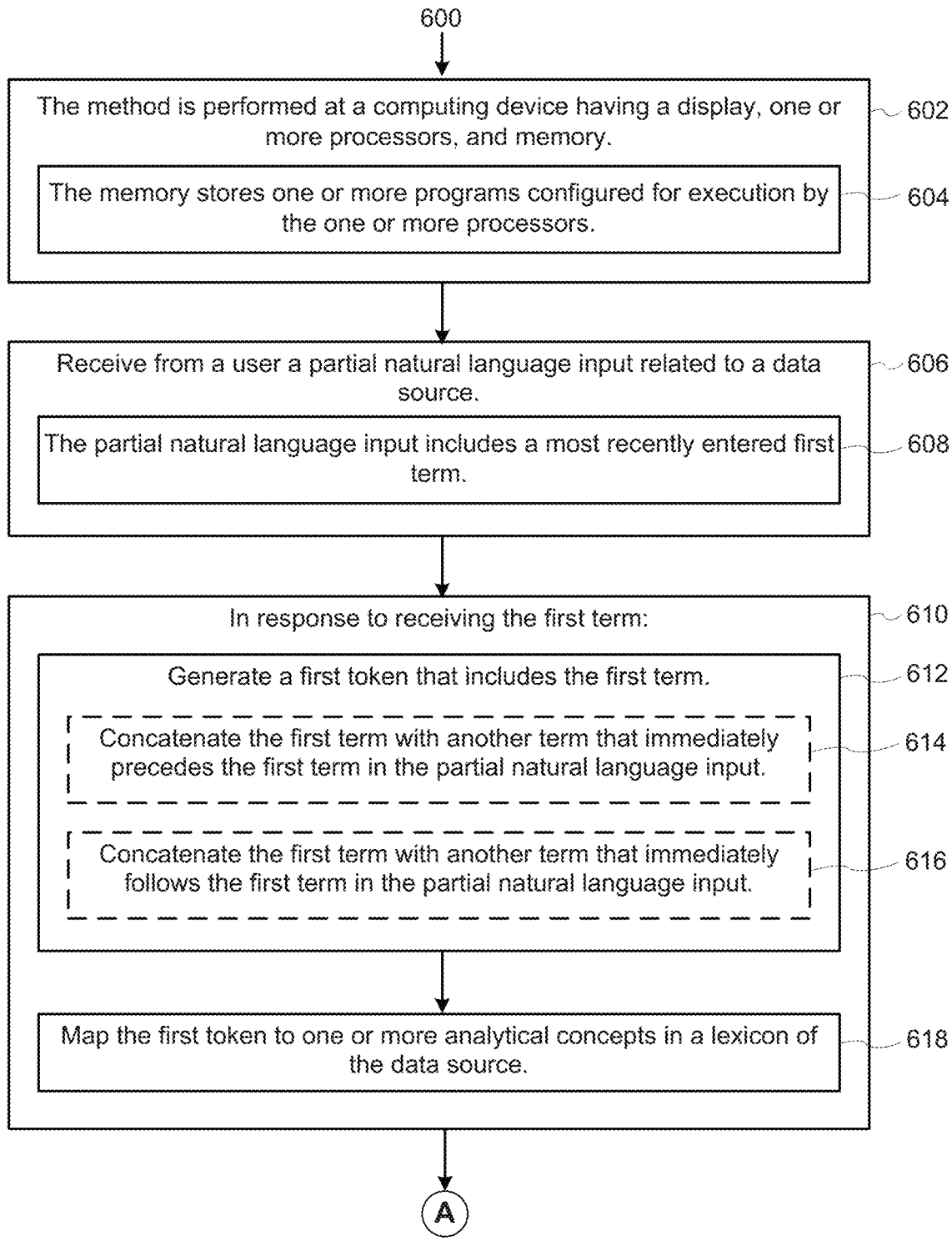
FIGS. 6A-6D provide a flowchart of a method performed at a computing device according to some implementations.
Figure 6B:
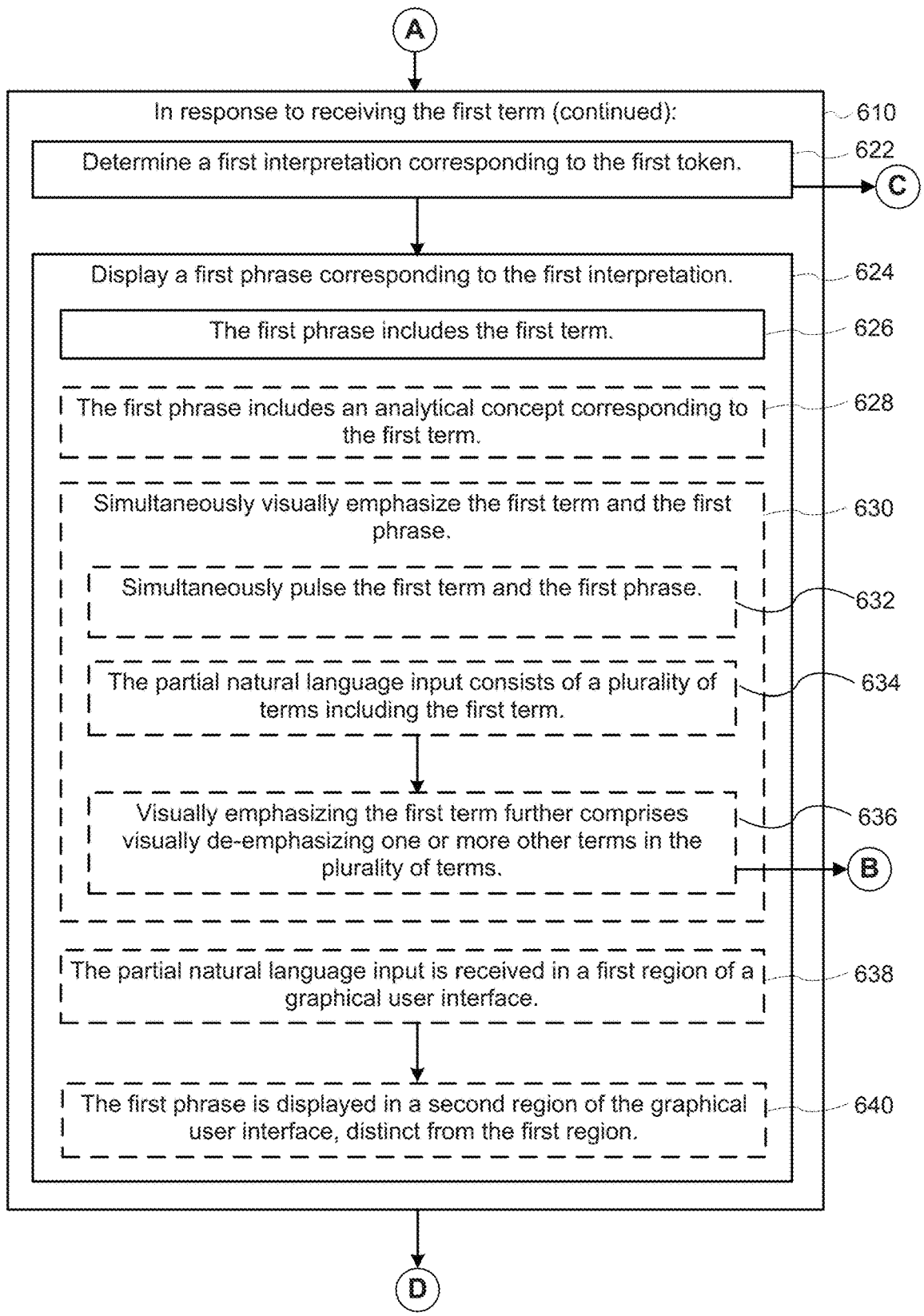
Figure 6C:
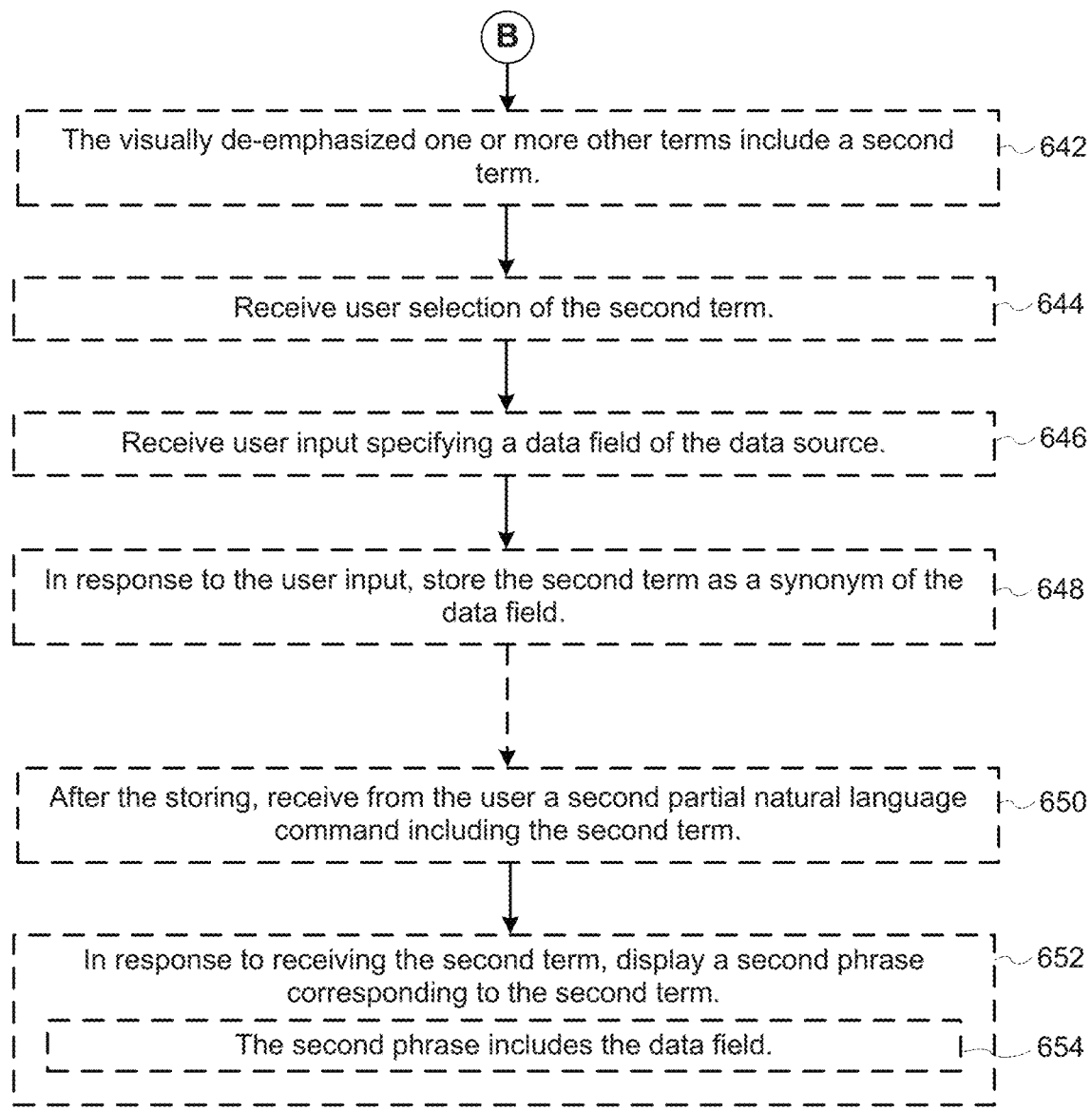
Figure 6C:
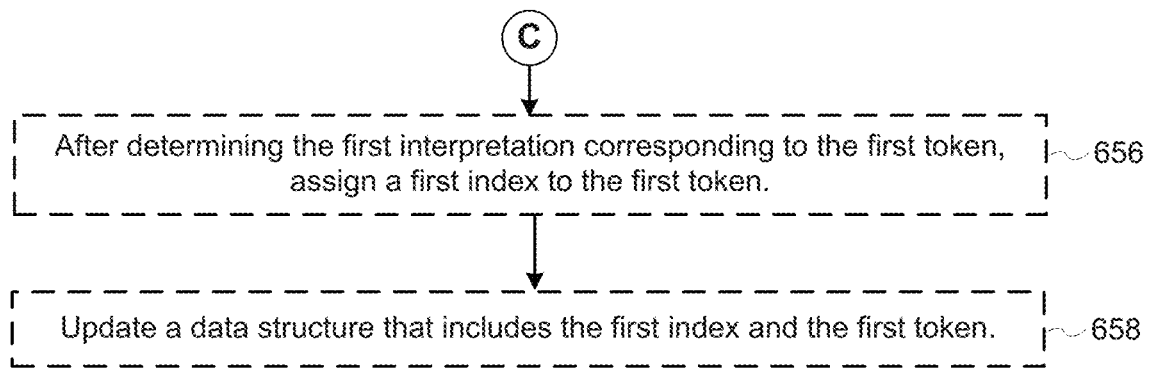
Figure 6D:
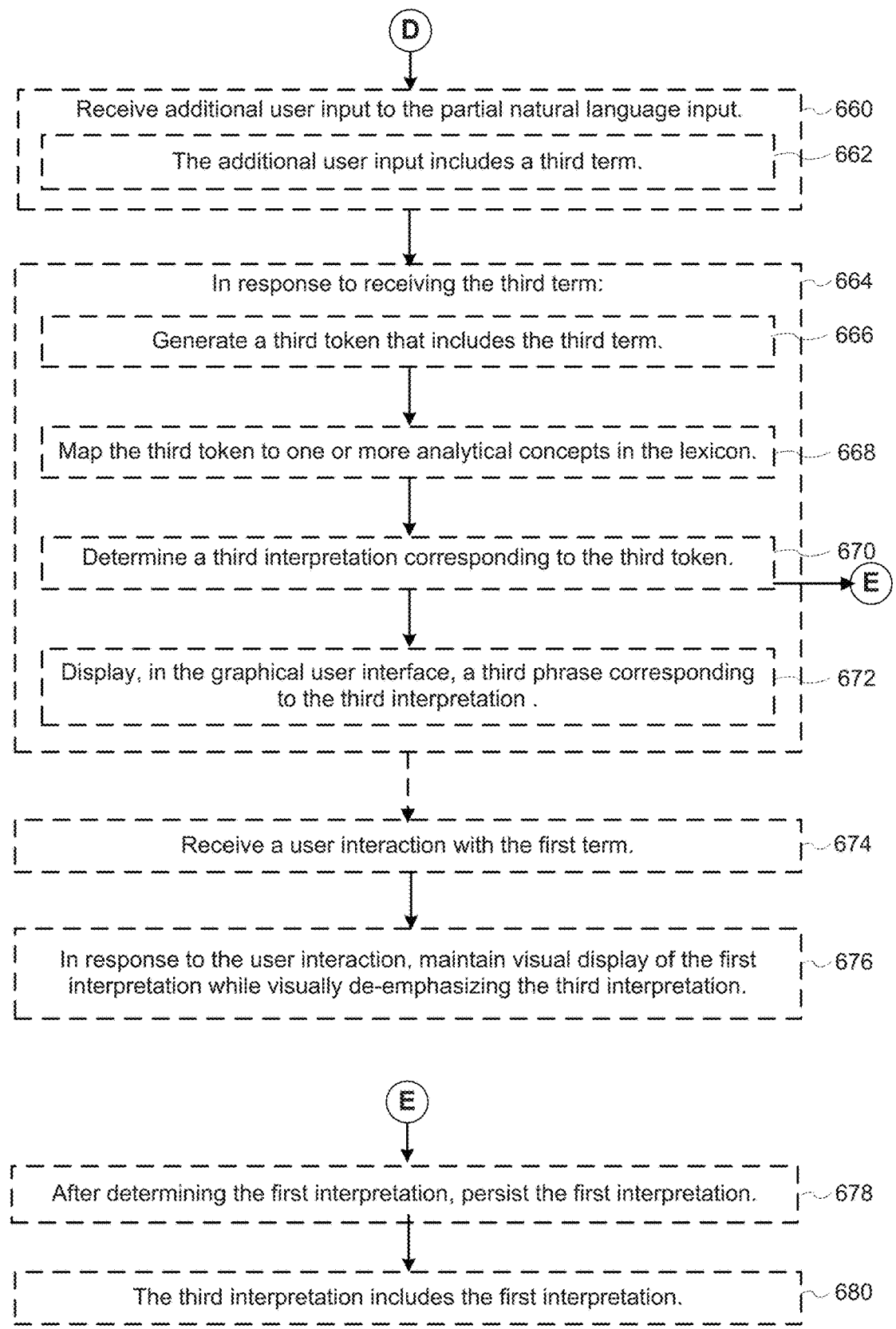

FIG. 5K illustrates another user interaction with the natural language command. In this example, the user hovers (552) over the term "sales." In response to the user interaction, the graphical user interface 100 displays a frame 554 around the terms "most sales" and displays the phrase 546 "top Segment by sum of Sales" corresponding to the terms "most sales."

FIGS. 6A-6D provide a flowchart of a method 600. The method 600 is also called a process.

The method 600 is performed (602) at a computing device 200 that has a display 212, one or more processors 202, and memory 206. The memory 206 stores (604) one or more programs configured for execution by the one or more processors 202. In some implementations, the operations shown in FIGS. 4A to 4O and FIGS. 5A to 5K correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 500 may be combined and/or the order of some operations may be changed.

The computing device 200 receives (606) from a user a partial natural language input (e.g., a query) related to a data source 258. The partial natural language input includes (608) a most recently entered first term.

For example, in FIG. 4C, the computing device 200 receives from a user a partial natural language input "what are furniture" related to a data source 258. The partial natural language input includes the most recently entered first term "furniture."

In some implementations, the first term may consist of one word (e.g., "furniture"). The first term may also consist of two words separated by a space (e.g., "San Francisco"). The first term may also consist of three or more words (e.g., "same day shipping"). The first term may also comprise a phrase (e.g., "furniture sales in California"), numbers (e.g., 2018), and/or a combination of letters and numbers (e.g., Just4U). The first term may also consist of a partial word (e.g., letters "furni").

Referring back to FIG. 6A, in response (610) to receiving the first term, the computing device 200 generates (612) a first token that includes the first term.

For example, in FIG. 4C, the computing device 200 generates a first token that includes the first term "furniture."

In some implementations, generating the first token includes concatenating (614) the first term with another term that immediately precedes the first term in the partial natural language input.

In some implementations, generating the first token includes concatenating (616) the first term with another term that immediately follows the first term in the partial natural language input.

As one example, a partial natural language input may include two terms such as "San" and "Francisco" that are adjacent to each other. In this scenario, the computing device 200 generates a token "San Francisco" by concatenating both the terms "San" and "Francisco." As another example, the partial natural language input may also include three consecutive terms such as "Napa," "Valley," and "wineries." In this scenario, the computing device 200 generates a token "Napa Valley wineries" by concatenating the three terms "Napa," "Valley," and "wineries." In some implementations, the multiple terms in a token are treated as one indivisible token term.

Referring back to FIG. 6A, the computing device 200 maps (618) the first token to one or more analytical concepts 266 in a lexicon of the data source (e.g., a grammar lexicon 262 and/or a data source lexicon 264).

In some instances, the first token consists of one a single word such as "Sales" or "furniture." The computing device 200 analyzes each keystroke as it is being input by the user, concatenates the keystrokes that form the word, and maps the word to an analytical concept. For example, in FIG. 4C, the computing device 200 concatenates the keystrokes "furni" in the partial natural language input 406 and keystrokes 416 "ture" to form the word "furniture." The computing device 200 also maps (interprets) the word "furniture" as a data value of the data field "Category" from the data source 258.

The computing device 200 determines (622) a first interpretation corresponding to the first token.

The computing device 200 displays (624) a first phrase corresponding to the first interpretation. The first phrase includes (626) the first term.

For example, in FIG. 4C, the computing device 200 displays a first phrase 420 "filter Category to furniture" corresponding to the first interpretation. The first phrase includes (626) the first term "furniture."

In some implementations, the first phrase includes (628) an analytical concept corresponding to the first term.

In some implementations, the analytical concept includes an aggregation, a group, a filter, a limit, a sort, a field (e.g., a data field), or a value (e.g., a data value of a data field).

For example, in FIG. 4E, the phrase 432 "sum of Sales" corresponding to the term 428 "sales" includes an aggregation of the data field "Sales."

In some implementations, displaying the first phrase further comprises simultaneously (630) visually emphasizing the first term and the first phrase.

For example, in FIG. 4G, displaying the phrase 442 "with State in California" corresponding to the term 444 "California" comprises simultaneously visually emphasizing the term 444 and the phrase 442.

In some implementations, visually emphasizing the first term and the phrase comprises displaying the first term and the first interpretation in a visually distinctive manner (e.g., boldface, italicized, using a font type, font size, and/or font color that is different from other terms and/or phrases in the graphical user interface 100). In some implementations, visually emphasizing the term and the phrase includes highlighting the term and/or the phrase, or adding a frame around the term (e.g., frame 470, FIG. 4M).

In some implementations, simultaneously visually emphasizing the first term and the first phrase includes simultaneously pulsing (632) the first term and the first phrase. This is illustrated in FIGS. 4D, 4G, and 4I.

In some instances, the partial natural language input consists (634) of a plurality of terms including the first term. In some implementations, visually emphasizing the first term further comprises (636) visually de-emphasizing one or more other terms in the plurality of terms.

For example, in FIG. 4D, the partial natural language input consists of the terms "what," "are," and "furniture." The plurality of terms includes the term "furniture." Visually emphasizing the term furniture" further comprises visually de-emphasizing the other terms "what" and "are" in the plurality of terms.

In some implementations, and as illustrated in FIGS. 4D to 4I, visually de-emphasizing one or more other terms includes graying out the other terms. In some implementations, the visually de-emphasized terms correspond to terms in the partial natural language command that have not been mapped to a phrase in the interpretation region. In some implementations, the visually de-emphasized terms are terms that are not interpreted (e.g., not understood or not recognized) by the data visualization application 230.

In some implementations, the partial natural language input is received (638) in a first region of a graphical user interface 100. The first phrase is displayed (640) in a second region of the graphical user interface, distinct from the first region.

For example, as illustrated in FIGS. 4D to 4O, the partial natural language input is received in a command box 124 of the graphical user interface 100. The phrases are displayed in a fields interpretation region 402 and/or a filters interpretation region 404 (or collectively referred to as a field interpretation region), which is distinct from the command box 124.

In some instances, the visually de-emphasized one or more other terms include (642) a second term. The computing device 200 receives (644) user selection of the second term. The computing device 200 receives (646) user input specifying a data field of the data source. In some implementations, in response to the user input, the computing device stores (648) the second term as a synonym of the data field.

For example, in FIG. 5A, the visually de-emphasized terms "which industry has the" include the term "industry." In FIG. 5B, the computing device 200 receives user selection of the term "industry." In FIG. 5F, the computing device 200 receives user input specifying the data field "Segment" of the data source. In response to the user input, the computing device stores (648) the term "industry" as a synonym of the data field "Segment."

In some implementations, storing the second item as a synonym of the data field includes updating the lexicon to associate the second term with the specified data field.

In some instances, after the storing, the computing device 200 receives (650) from the user a second partial natural language command including the second term. In response to receiving the second term, the computing device 200 displays (652) a second phrase corresponding to the second term. The second phrase includes (654) the data field.

For example, in FIG. 5H, the computing device receives from the user a partial natural language command 536 "which industry" that includes the term "industry." In response to receiving the term, the computing device 200 displays a phrase 542 "by Segment" corresponding to the term "industry." The phrase 542 includes the data field "Segment."

In some implementations, after determining the first interpretation corresponding to the first token, the computing device 200 assigns (656) a first index to the first token. The computing device 200 updates (658) a data structure that includes the first index and the first token. This is illustrated in FIG. 4O.

In some implementations, the computing device 200 receives (660) additional user input to the partial natural language input. The additional user input includes (662) a third term. In response (664) to receiving the third term, the computing device 200 generates (666) a third token that includes the third term. The computing device 200 maps (668) the third token to one or more analytical concepts in the lexicon. The computing device 200 determines (670) a third interpretation corresponding to the third token. The computing device 200 also displays (672) in a graphical user interface a third phrase corresponding to the third interpretation.

For example, in FIG. 4H, the computing device 200 receives additional user input "in 2018" to the partial natural language input "what are furniture sales from california." The additional user input includes the term "2018." In response to receiving the term "2018," the computing device 200 generates a third token ("2018") that includes the term "2018." The computing device 200 maps the third token to one or more analytical concepts in the lexicon (e.g., maps the token "2018" to a year that can be applied to a date data field). The computing device 200 determines an interpretation corresponding to the token. The computing device 200 also displays (672) in a graphical user interface a phrase 454 "with Order Date in 2018" corresponding to the interpretation.

In some implementations, the additional user input is appended to the partial natural language input. For example, in FIG. 4H, the additional user input "in 2018" is appended to an existing partial natural language input "what are furniture sales from California." In some implementations, the additional user input comprises a modification of an existing term of the partial natural language input. For example, the partial natural language input may comprise "sales of furniture in California" and the additional user input may comprise replacing the term "furniture" with "chairs," and hence the modified natural language input query becomes "sales of chairs in California." In this scenario, the natural language processing system 236 (e.g., a parser of the system 236) is still going to parse the entire query, but it is going to skip the tokenization process for tokens that have already been annotated (e.g., tokens "sales" and "California"). In some implementations, the natural processing system 236 will process the modified, tokenized query through a grammar parser (e.g., ArkLang), which then determines how to combine the tokens in expressions that are grammatically sound and fully specified.

In some instances, the computing device 200 receives (674) a user interaction with the first term. In response to the user interaction, the computing device 200 maintains (676) visual display of the first phrase while visually de-emphasizing the third phrase.

For example, in FIG. 4L, the computing device 200 receives a user interaction comprises a hovering over (466) the term "California." In response to the user interaction, the computing device 200 maintains visual display of the phrase 442 "State in California" corresponding to the term "California" while visually de-emphasizing the phrases 432, 454, and 420.

In some instances, after determining the first interpretation, the computing device 200 persists (678) the first interpretation. The third interpretation includes (680) the first interpretation.

For example, in FIG. 5H, the computing device determines a first interpretation (the data field "Segment") corresponding to the term "industry." The computing device 200 persists the first interpretation. The computing device 200 determines a third interpretation corresponding to the term "top sales." The phrase 546 "top Segment by sum of sales" corresponding to the third interpretation includes the first interpretation "Segment."

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a computing device having a display, one or more processors, and memory storing one or more programs configured for execution by the one or more processors:
receiving from a user a partial natural language input related to a data source, the partial natural language input including a most recently entered first term;
in response to receiving the first term:
generating a first token that includes the first term;
mapping the first token to one or more analytical concepts in a lexicon of the data source;
determining one or more interpretations corresponding to the first term in accordance with the mapping;
in accordance with a determination that the one or more interpretations include a first interpretation that meets a confidence threshold, automatically annotating the first term, including:
displaying a first phrase corresponding to the first interpretation, the first phrase including the first term and an analytical concept corresponding to the first term; and
simultaneously visually emphasizing the first term and the first displayed phrase.

2. The method of claim 1, wherein generating the first token includes concatenating the first term with another term that immediately precedes the first term in the partial natural language input.

3. The method of claim 1, wherein generating the first token includes concatenating the first term with another term that immediately follows the first term in the partial natural language input.

4. The method of claim 1, wherein simultaneously visually emphasizing the first term and the first displayed phrase includes simultaneously pulsing the first term and the first phrase.

5. The method of claim 1, wherein:
the partial natural language input consists of a plurality of terms including the first term; and
visually emphasizing the first displayed term further comprises visually de-emphasizing one or more other terms in the plurality of terms.

6. The method of claim 5, wherein the visually de-emphasized one or more other terms include a second term, the method further comprising:

receiving user selection of the second term;
receiving user input specifying a data field name of a data field from the data source; and
in response to the user input, storing the second term as a synonym of the data field name.

7. The method of claim 6, further comprising:
after the storing, receiving from the user a second partial natural language command including the second term; and
in response to receiving the second term, displaying a second phrase corresponding to the second term, the second phrase including the data field name.

8. The method of claim 1, wherein:
the partial natural language input is received in a first region of a graphical user interface; and
the first phrase is displayed in a second region of the graphical user interface, distinct from the first region.

9. The method of claim 1, further comprising:
after determining the first interpretation corresponding to the first token, assigning a first index to the first token;
generating a data structure that includes the first index and the first token.

10. The method of claim 1, further comprising:
receiving additional user input to the partial natural language input, the additional user input including a third term;
in response to receiving the third term:
  generating a third token that includes the third term;
  mapping the third token to one or more analytical concepts in the lexicon;
  determining a third interpretation corresponding to the third token; and
  displaying in a graphical user interface a third phrase corresponding to the third interpretation.

11. The method of claim 10, further comprising:
after determining the first interpretation, persisting the first interpretation;
wherein the third interpretation includes the first interpretation.

12. The method of claim 10, further comprising:
receiving a user interaction with the first term; and
in response to the user interaction, maintaining visual display of the first phrase while visually de-emphasizing the third phrase.

13. A computing device, comprising:
a display;
one or more processors; and
memory coupled to the one or more processors, the memory storing one or more programs configured to be executed by the one or more processors, the one or more programs including instructions for:
  receiving from a user a partial natural language input related to a data source, the partial natural language input including a most recently entered first term;
  in response to receiving the first term:
    generating a first token that includes the first term;
    mapping the first token to one or more analytical concepts in a lexicon of the data source;
    determining one or more interpretations corresponding to the first term in accordance with the mapping;
    in accordance with a determination that the one or more interpretations include a first interpretation that meets a confidence threshold, automatically annotating the first term, including:
      displaying a first phrase corresponding to the first interpretation, the first phrase including the first term and an analytical concept corresponding to the first term; and
      simultaneously visually emphasizing the first term and the first displayed phrase.

14. The computing device of claim 13, wherein the instructions for generating the first token includes instructions for concatenating the first term with another term that immediately precedes the first term in the partial natural language input.

15. The computing device of claim 13, wherein the instructions for generating the first token includes instructions for concatenating the first term with another term that immediately follows the first term in the partial natural language input.

16. The computing device of claim 13, wherein the instructions for simultaneously visually emphasizing the first term and the first phrase includes instructions for simultaneously pulsing the first term and the first phrase.

17. A non-transitory computer-readable storage medium storing one or more programs, the one or more programs comprising instructions, which when executed by a computing device having a display, cause the computing device to perform operations comprising:
receiving from a user a partial natural language input related to a data source, the partial natural language input including a most recently entered first term;
in response to receiving the first term:
  generating a first token that includes the first term;
  mapping the first token to one or more analytical concepts in a lexicon of the data source;
  determining one or more interpretations corresponding to the first term in accordance with the mapping;
  in accordance with a determination that the one or more interpretations include a first interpretation that meets a confidence threshold, automatically annotating the first term, including:
    displaying a first phrase corresponding to the first interpretation, the first phrase including the first term and an analytical concept corresponding to the first term; and
  simultaneously visually emphasizing the first term and the first displayed phrase.

* * * * *